United States Patent [19]
Ito et al.

[11] 3,990,071
[45] Nov. 2, 1976

[54] DATA TRANSMISSION SYSTEM USING FREQUENCY PERMUTATION CODES

[75] Inventors: Tetsuo Ito; Motohisa Nishihara, both of Hitachi, Japan

[73] Assignee: Hitachi, Ltd., Japan

[22] Filed: Aug. 30, 1974

[21] Appl. No.: 502,195

[30] Foreign Application Priority Data
Aug. 31, 1973 Japan............................ 48-97157
Aug. 31, 1973 Japan............................ 48-97173

[52] U.S. Cl. .................... 340/347 DD; 235/154; 340/171 PF
[51] Int. Cl.² ................ H03K 13/00; H04B 11/00
[58] Field of Search ......... 340/339, 171 R, 171 PF, 340/204, 347 DD; 325/38 A; 235/154; 178/79, 88

[56] References Cited
UNITED STATES PATENTS

| | | | |
|---|---|---|---|
| 2,369,662 | 2/1945 | Deloraine et al............. | 340/171 PF |
| 2,395,693 | 2/1946 | Sorensen...................... | 340/171 PF |
| 2,811,708 | 10/1957 | Byrnes et al. ................ | 340/171 PF |
| 2,900,621 | 8/1959 | Stenerson et al............. | 340/171 PF |
| 3,039,081 | 6/1962 | Smith........................... | 340/171 PF |
| 3,344,400 | 9/1967 | Nemeth......................... | 340/171 R |
| 3,506,966 | 4/1970 | Magnuski..................... | 340/171 R |
| 3,668,643 | 6/1972 | Germain ...................... | 340/171 R |
| 3,860,913 | 1/1975 | Weeks et al.................. | 340/171 PF |

Primary Examiner—Thomas J. Sloyan
Attorney, Agent, or Firm—Craig & Antonelli

[57] ABSTRACT

A data transmission system is disclosed in which the information to be transmitted comprises a plurality of unit information pieces each of which in turn is indicated by a numerical code of a binary number or a binary-coded decimal number having a predetermined number of bits. One of said numerical codes makes up a fundamental matrix of a frequency permutation code comprising a plurality of different frequency signals; the number of times by which the information in the form of numerical codes shifts the elements of the fundamental matrix on the basis of weight constants determined by said number of bits is detected; each numerical code is converted into a permutation code in response to the above-mentioned detection and transmitted at the transmitting end in the form of a plurality of different frequency signals according to the elements of the shifted permutation code; the frequency signals thus transmitted are received and stored in sequence and detection is made as to how many shifts are required in order that the matrix elements of said stored permutation code may be made identical to with the fundamental matrix; and the permutation code is converted into a numerical code by calculation of the detected number of shifts and the weight constants.

9 Claims, 24 Drawing Figures

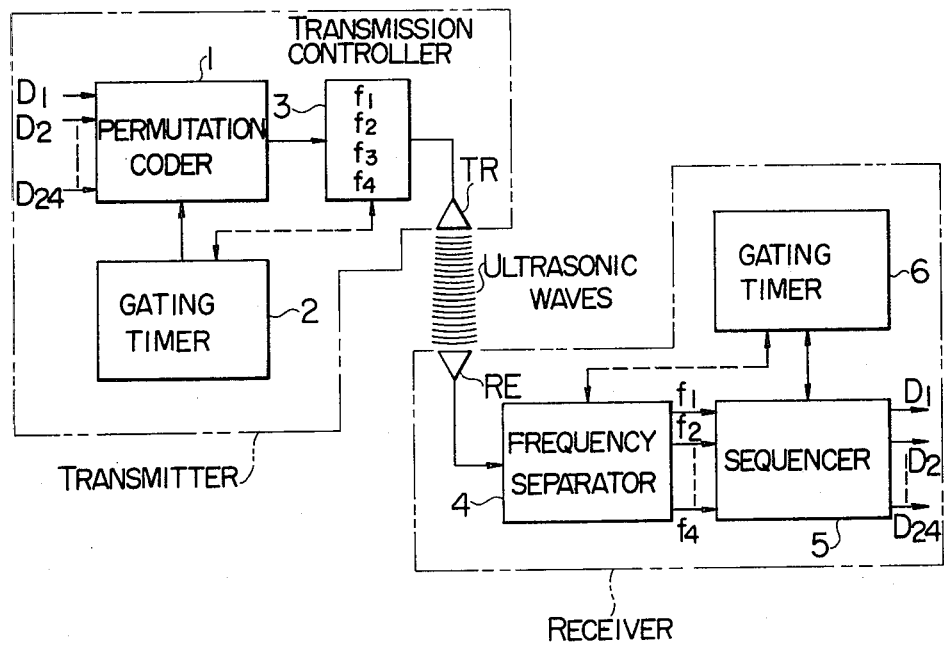

FIG. 3

| DATA | NUMERICAL CODE IN BINARY NUMBER | DECIMAL VERSION | NUMBER OF WEIGHT CONSTANTS (NO. OF ROWS SHIFTED) | | | PERMUTATION CODE | | | |
|---|---|---|---|---|---|---|---|---|---|
| | | | NO.1 | NO.2 | NO.3 | $t_1$ | $t_2$ | $t_3$ | $t_4$ |
| $D_0$ | 0 0 0 0 0 | 0 | 0 | 0 | 0 | $P_1$ | $P_2$ | $P_3$ | $P_4$ |
| $D_1$ | 0 0 0 0 1 | 1 | 0 | 0 | 1 | $P_1$ | $P_2$ | $P_4$ | $P_3$ |
| $D_2$ | 0 0 0 1 0 | 2 | 0 | 1 | 0 | $P_1$ | $P_3$ | $P_4$ | $P_2$ |
| $D_3$ | 0 0 0 1 1 | 3 | 0 | 1 | 1 | $P_1$ | $P_3$ | $P_2$ | $P_4$ |
| $D_4$ | 0 0 1 0 0 | 4 | 0 | 2 | 0 | $P_1$ | $P_4$ | $P_2$ | $P_3$ |
| $D_5$ | 0 0 1 0 1 | 5 | 0 | 2 | 1 | $P_1$ | $P_4$ | $P_3$ | $P_2$ |
| $D_6$ | 0 0 1 1 0 | 6 | 1 | 0 | 0 | $P_2$ | $P_3$ | $P_4$ | $P_1$ |
| $D_7$ | 0 0 1 1 1 | 7 | 1 | 0 | 1 | $P_2$ | $P_3$ | $P_1$ | $P_4$ |
| $D_8$ | 0 1 0 0 0 | 8 | 1 | 1 | 0 | $P_2$ | $P_4$ | $P_1$ | $P_3$ |
| $D_9$ | 0 1 0 0 1 | 9 | 1 | 1 | 1 | $P_2$ | $P_4$ | $P_3$ | $P_1$ |
| $D_{10}$ | 0 1 0 1 0 | 10 | 1 | 2 | 0 | $P_2$ | $P_1$ | $P_3$ | $P_4$ |
| $D_{11}$ | 0 1 0 1 1 | 11 | 1 | 2 | 1 | $P_2$ | $P_1$ | $P_4$ | $P_3$ |
| $D_{12}$ | 0 1 1 0 0 | 12 | 2 | 0 | 0 | $P_3$ | $P_4$ | $P_1$ | $P_2$ |
| $D_{13}$ | 0 1 1 0 1 | 13 | 2 | 0 | 1 | $P_3$ | $P_4$ | $P_2$ | $P_1$ |
| $D_{14}$ | 0 1 1 1 0 | 14 | 2 | 1 | 0 | $P_3$ | $P_1$ | $P_2$ | $P_4$ |
| $D_{15}$ | 0 1 1 1 1 | 15 | 2 | 1 | 1 | $P_3$ | $P_1$ | $P_4$ | $P_2$ |
| $D_{16}$ | 1 0 0 0 0 | 16 | 2 | 2 | 0 | $P_3$ | $P_2$ | $P_4$ | $P_1$ |
| $D_{17}$ | 1 0 0 0 1 | 17 | 2 | 2 | 1 | $P_3$ | $P_2$ | $P_1$ | $P_4$ |
| $D_{18}$ | 1 0 0 1 0 | 18 | 3 | 0 | 0 | $P_4$ | $P_1$ | $P_2$ | $P_3$ |
| $D_{19}$ | 1 0 0 1 1 | 19 | 3 | 0 | 1 | $P_4$ | $P_1$ | $P_3$ | $P_2$ |
| $D_{20}$ | 1 0 1 0 0 | 20 | 3 | 1 | 0 | $P_4$ | $P_2$ | $P_3$ | $P_1$ |
| $D_{21}$ | 1 0 1 0 1 | 21 | 3 | 1 | 1 | $P_4$ | $P_2$ | $P_1$ | $P_3$ |
| $D_{22}$ | 1 0 1 1 0 | 22 | 3 | 2 | 0 | $P_4$ | $P_3$ | $P_1$ | $P_2$ |
| $D_{23}$ | 1 0 1 1 1 | 23 | 3 | 2 | 1 | $P_4$ | $P_3$ | $P_2$ | $P_1$ |

FIG. 4a

| SIGNAL \ TIME | t₁ | t₂ | t₃ | t₄ |
|---|---|---|---|---|
| P₁ | 1 | 0 | 0 | 0 |
| P₂ | 0 | 1 | 0 | 0 |
| P₃ | 0 | 0 | 1 | 0 |
| P₄ | 0 | 0 | 0 | 1 |

FIG. 4b

| SIGNAL \ TIME | t₁ | t₂ | t₃ | t₄ |
|---|---|---|---|---|
| P₁ | 0 | 0 | 1 | 0 |
| P₂ | 0 | 0 | 0 | 1 |
| P₃ | 1 | 0 | 0 | 0 |
| P₄ | 0 | 1 | 0 | 0 |

FIG. 4b′

| | | |
|---|---|---|
| 0 | 1 | 0 |
| 0 | 0 | 1 |
| 1 | 0 | 0 |

FIG. 4c

| SIGNAL \ TIME | t₁ | t₂ | t₃ | t₄ |
|---|---|---|---|---|
| P₁ | 0 | 1 | 0 | 0 |
| P₂ | 0 | 0 | 1 | 0 |
| P₃ | 1 | 0 | 0 | 0 |
| P₄ | 0 | 0 | 0 | 1 |

FIG. 4c′

| | |
|---|---|
| 1 | 0 |
| 0 | 1 |

FIG. 4d

| SIGNAL \ TIME | t₁ | t₂ | t₃ | t₄ |
|---|---|---|---|---|
| P₁ | 0 | 1 | 0 | 0 |
| P₂ | 0 | 0 | 0 | 1 |
| P₃ | 1 | 0 | 0 | 0 |
| P₄ | 0 | 0 | 1 | 0 |

FIG. 5a

| SIGNAL \ TIME | t1 | t2 | t3 | t4 |
|---|---|---|---|---|
| P1 | 1 | 0 | 0 | 0 |
| P2 | 0 | 1 | 0 | 0 |
| P3 | 0 | 0 | 1 | 0 |
| P4 | 0 | 0 | 0 | 1 |

FIG. 5b

| SIGNAL \ TIME | t1 | t2 | t3 | t4 |
|---|---|---|---|---|
| P1 | 0 | 1 | 0 | 0 |
| P2 | 1 | 0 | 0 | 0 |
| P3 | 0 | 0 | 0 | 1 |
| P4 | 0 | 0 | 1 | 0 |

FIG. 5c

| SIGNAL \ TIME | t1 | t2 | t3 | t4 |
|---|---|---|---|---|
| P1 | 1 | 0 | 0 | 0 |
| P2 | 0 | 0 | 0 | 1 |
| P3 | 0 | 0 | 1 | 0 |
| P4 | 0 | 1 | 0 | 0 |

FIG. 5d

| SIGNAL \ TIME | t1 | t2 | t3 | t4 |
|---|---|---|---|---|
| P1 | 1 | 0 | 0 | 0 |
| P2 | 0 | 1 | 0 | 0 |
| P3 | 0 | 0 | 0 | 1 |
| P4 | 0 | 0 | 1 | 0 |

FIG. 14

| INPUT | | | OUTPUT | | | | |
|---|---|---|---|---|---|---|---|
| $a_3$ ($g_3$) | $a_2$ ($g_2$) | $a_1$ ($g_1$) | $b_0$ ($d_0$) | $b_1$ ($d_1$) | $b_2$ ($d_2$) | $b_3$ ($d_3$) | $b_4$ ($d_4$) |
| 0 | 0 | 0 | 1 | 0 | 0 | 0 | 0 |
| 0 | 0 | 1 | 0 | 1 | 0 | 0 | 0 |
| 0 | 1 | 0 | 0 | 0 | 1 | 0 | 0 |
| 0 | 1 | 1 | 0 | 0 | 0 | 1 | 0 |
| 1 | 0 | 0 | 0 | 0 | 0 | 0 | 1 |

FIG. 15a

| TIME / SIGNAL | $t_1$ | $t_2$ | $t_3$ | $t_4$ |
|---|---|---|---|---|
| $P_1$ | 1 | 0 | 0 | 0 |
| $P_2$ | 0 | 1 | 0 | 0 |
| $P_3$ | 0 | 0 | 1 | 0 |
| $P_4$ | 0 | 0 | 0 | 1 |

FIG. 15b

| TIME / SIGNAL | $t_1$ | $t_2$ | $t_3$ | $t_4$ |
|---|---|---|---|---|
| $P_1$ | 0 | 1 | 0 | 0 |
| $P_2$ | 1 | 0 | 0 | 0 |
| $P_3$ | 0 | 0 | 0 | 1 |
| $P_4$ | 0 | 0 | 1 | 0 |

FIG. 15c

| TIME / SIGNAL | $t_1$ | $t_2$ | $t_3$ | $t_4$ |
|---|---|---|---|---|
| $P_1$ | 1 | 0 | 0 | 0 |
| $P_2$ | 0 | 0 | 0 | 1 |
| $P_3$ | 0 | 0 | 1 | 0 |
| $P_4$ | 0 | 1 | 0 | 0 |

FIG. 15d

| TIME / SIGNAL | $t_1$ | $t_2$ | $t_3$ | $t_4$ |
|---|---|---|---|---|
| $P_1$ | 1 | 0 | 0 | 0 |
| $P_2$ | 0 | 1 | 0 | 0 |
| $P_3$ | 0 | 0 | 0 | 1 |
| $P_4$ | 0 | 0 | 1 | 0 |

DATA TRANSMISSION SYSTEM USING FREQUENCY PERMUTATION CODES

BACKGROUND OF THE INVENTION

1. Field of the Invention

This invention relates to a data transmission system or more in particular to a data transmission system suitable for transmitting information under water.

2. Description of the Prior Art

With recent progress in development in the ocean, there is an increased demand for under water transmission including interchange of information between divers and instructions for the operation of an underwater bulldozer or other underwater equipment, to mention a few. Moreover, as the amount of information handled is greatly increasing a demand is growing for quicker and more reliable data transmission.

Generally, data transmission under water uses ultrasonic waves, by the use of which a variety of underwater communication systems have so far been developed. One of such systems employs a method in which the data to be transmitted are encoded and transmitted on respective ultransonic wave signals whose frequencies are different from each other. Therefore, this system requires wave signals of different frequencies, each corresponding to a specific one of the data to be transmitted. Thus, this system has disadvantages such that if twenty-four different data are to be transmitted, as many as twenty-four different frequency signals must be provided. obviate such a disadvantage consists in transmitting the data in a binary code comprising a plurality of bits. The last-mentioned method of transmission is such that a couple of frequency signals $f_1$ and $f_0$ corresponding to the binary bits "1" and "0" respectively are transmitted under water at regular intervals of time, which signals are frequency-separated into $f_1$ and $f_0$ are decoded at the receiving end.

During transmission under water, however, the ultrasonic wave signals are subject, on the one hand, to interference by waves reflected from the botton or the surface of the water or floating objects, and the received sound reverberates, resulting in a "trailing", on the other.

In order to eliminate the adverse effect of reverberation, it is necessary to transmit an ultrasonic wave of a bit after the reverberation, if any, of the ultrasonic wave of the preceding bit has been completely eliminated, thus requiring a considerable period of time for all the data comprising a plurality of bits to be completely transmitted.

Specifically, the time required to completely eliminate the reverberation in the underwater environment should be considered to be approximately 100 msec per bit of information, so that it takes one second to transmit the data of 10 bits as an example.

In addition to the above-mentioned disadvantage resulting in a low data transmission speed, the fact that the time required for data transmission becomes longer the greater the amount of data to be transmitted, the amount of data to be transmitted depending on the number of bits, leads to be shortcoming that the data is more liable to be adversely affected by noise.

Another method of information transmission is a modification of the frequency permutation system, in which a plurality of frequency signals are arranged in different orders at different times and each of the resulting permutations makes up a unit data to be transmitted and received. In the event that the unit data to be transmitted is determined as the numeral 1, 2, 3, ..... or $n$ or the alphabetical character A, B, C, ..... or Z, for example, different patterns depending on the permutations of the frequency signals are made to correspond or are allotted to the responsive data to be transmitted including the numerals 1, 2, 3, ......, $n$ and the alphabetical characters A, B, C, ......, Z in advance. Thus, by sending out the patterns of permutations in a sequence at the transmitting end, it is possible to know the information transmitted as a whole by deciphering the sequential patterns of unit data. Of course, it is necessary to provide a device capable of decoding a variety of arriving unit data immediately at the receiving end.

This data transmission system is generally thought to provide an excellent means of communication under water in view of reduced communication interference due to reverberation and a higher communication speed.

In many data transmission systems, the data introduced in the input or taken out at the output are in the form of binary numbers or binary-coded decimal numbers. Especially in recent years, it is often true that the data are processed in the data processing system before and after transmission and receipt, so that successful commercial application of the above-mentioned data transmission systems requires the provision of a device for converting numerical codes of binary numbers of binary-coded decimal numbers into permutation codes of frequencies at the transmitting end and a converter for converting such permutation codes into numerical codes at the receiving end. Therefore, is improved the data transmission system of this type, especially in the field of underwater communication, by providing the above-described converter means at the transmitting and receiving ends.

The present invention the description of which is made below relates to such converter devices.

SUMMARY OF THE INVENTION

It is accordingly an object of the invention to provide a data transmission system capable of transmitting and receiving a multiplicity of pieces of information at high speed with high accuracy.

Another object of the invention is to provide a data transmission system which is easily coupled with a data processing system at the transmitting and/or receiving ends.

A further object of the invention is to provide a data transmission system which receives no erroneous information due to reverberation especially in the field of underwater application using an ultrasonic wave.

According to the present invention, a numerical code is employed as a unit data comprising a binary number or a binary-coded decimal number having a predetermined number of bits. Further, a given one of a plurality of such numerical codes is transformed to a fundamental matrix of frequency permutation codes consisting of a plurality of different frequency signals. And a plurality of numerals obtained by the operation of both a plurality of weight constants depending on the number of bits involved in each of the numerical codes and the above-mentioned numerals associated with the numerical codes are considered to be the same as the number of shifts of the elements of the fundamental matrix. Thus a plurality of different frequency signals corresponding to the elements of the matrix of the permutation codes newly obtained by shifting the elements are sent out in sequence at the transmitting end. At the receiving end, on the other hand, the frequency signals are received and stored in sequence and passed through a processer to detect how many shifts must be effected to render the matrix elements of the stored permutation codes identical with the elements of the fundamental matrix in such a manner that a numeral obtained by processing the detected number of shifts and the weight constants is identical to the numeral employed at the transmitting end.

BRIEF DESCRIPTION OF THE DRAWINGS

FIG. 1 is a table showing the relationship between the data to be transmitted by the data transmission system according to the invention and the permutation codes used therefor.

FIG. 2 is a block diagram showing the data transmission system according to the invention.

FIGS. 3, 4a, 4b, 4b', 4c, 4c', 4d, 5a, 5b, 5c and 5d show tables for explaining the fundamental operating principle of the invention.

FIG. 14 is a table for explaining the operation of the binary counter and the decoder shown in FIG. 11.

FIGS. 15a to 15d are tables for explaining the fundamental principle of the invention.

DESCRIPTION OF THE PREFERRED EMBODIMENTS

Figure 6:
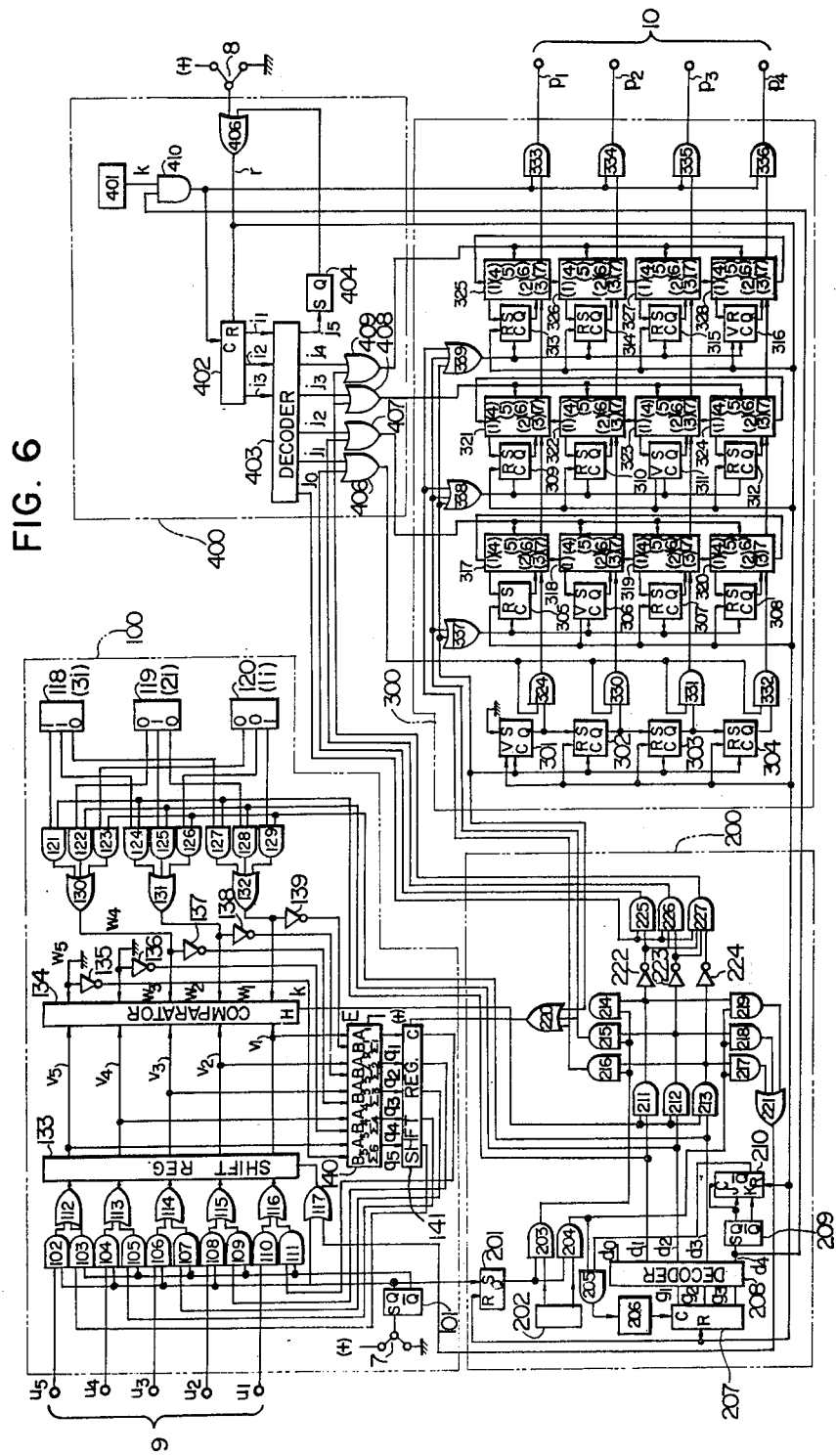
FIG. 6 is a block diagram showing a converter device at the transmitting end according to an embodiment of the present invention.

Prior to giving a detailed description of the invention, the general principle on which the data transmission system according to the invention operates will be explained with reference to the accompanying drawings.

The transmission sequence of $n$ frequencies $f_1, f_2, ......, f_n$ is changed and they are encoded as shown below.

$f_1, f_2 .......... f_{n-1}, f_n$
$f_1, f_2, .......... f_n, f_{n-1}$
$f_n, f_{n-1} .......... f_2, f_1$

Each of the frequency rows is transmitted as a unit data, thereby making it possible to obtain as many different uiit data as the factorial of the number $n$, i.e., $n!$, (hereinafter referred to merely as the "the data"), FIG. 1 showing the relation between the data and the permutation codes available in such a transmission system. For facilitating better understanding, let us consider the permutation codes available from four frequency signals $f_1$ to $f_4$. As shown in FIG. 1, 24 permutations of data including $D_0$ to $D_{23}$ are available for transmission.

Referring to FIG. 2 showing a configuration of the transmitter and receiver based on the data transmission system according to the invention, $24 = 4!$ different data are available for transmission on the basis of the permutation codes of 4 frequency signals $f_1, f_2, f_3$ and $f_4$ as shown in FIG. 1. In FIG. 2, the transmitter comprises a permutation coder 1 for frequency components, a gating timer 2, a transmission controller 3 and a wave transmitter TR. The receiver, by contact, comprises a frequency separator 4, a sequencer 5, a gating timer 6 and a wave receiver RE.

The operation of the transmitter and receiver mentioned above will be briefly explained below. Assume that among the 24 data, a binary number of corresponding to data $D_2$ is applied to the permutation coder 1. The frequency signals are converted into a permutation code comprising $f_1, f_3, f_4, f_2$ arranged in that order by the permutation coder 1. When the permutation code by frequency components is thus determined, gate pulses are generated by the gating timer at regular intervals of time and energize the transmission controller 3 in accordance with the frequency permutation code, with the result that ultrasonic wave signals having frequencies corresponding to data $D_2$ are propagated from the wave transmitter TR. The signals thus propagated from the transmitter are received by the wave receiver RE at the receiving end, separated into the frequency components $f_1$ to $f_4$ by the frequency separator 4 and collated with the gate pulses generated by gating timer 6. The frequency sequencer 5 is for restoring the data arriving from the transmitter into the original numerical code by detecting the chronological order to which the four frequency components $f_1$ to $f_4$ are received, the order being "$f_1, f_3, f_4, f_2$" in the case of data $D_2$.

The data transmission system described above which may be considered as a modification of the frequency permutation type displays its full ability in the field of underwater communication by the use of ultrasonic waves as mentioned above, and it is for this very reason that the data transmission system requires a device for converting the data in the form of numerical code into a permutation code comprising frequency signals and another converter for converting such a permutation code into a numerical code. These converting devices according to the present invention will be described below.

The fundamental principle of the invention will first be explained with reference to the converter for converting numerical codes into permutation codes at the transmitting end.

If the trigger pulse signals used in transmitting the $n$ different frequency signals $f_1, f_2, ......, f_n$ are defined as $P_1, P_2, ......, P_n$, the data comprised of the time sequence of the frequency signals $f_1, f_2, ......, f_n$ is equivalent to the data comprising the time sequence of pulse signals $P_1, P_2, ......, P_n$, both being the same permutation codes. In this connection, the pulse signals $P_1, P_2, ......, P_n$ may be referred to as the element signals as they represent the elements of the permutation code.

The data based on the permutation codes has not only the element signals $P_1, P_2, ......, P_n$ but also the dimension of time. Therefore, in a matrix $D = [dij]$ having the dimension of a row including the element signals $P_1, P_2, ......, P_n$ and the dimension of a column including time sequence $t_1, t_2, ......, t_n$, a given data can be expressed in a matrix having $n$ rows and $n$ columns, if the element $dij$ is defined as "1" in the presence of the element signal $P_i$ at time $tj$, and "0" in the absence of the element signal $P_i$ at time $tj$.

For example, the matrix in which all the diagonal elements $dii$ are "1" and the other elements "0" represents the data comprising the permutation code $P_1, P_2,$ ..., $P_{n-1}$, $P_n$. This data will be hereinafter referred to as the fundamental data and the matrix associated therewith as the fundamental matrix.

To facilitate better understanding, explanation will be made of the case of which a numerical code of a binary number is converted into a permutation code representing a chronological sequence of the four element signals $P_1$, $P_2$, $P_3$ and $P_4$.

In FIG. 3, the data $D_0$ to $D_{23}$ derived from the permutations of four element signals $P_1$ to $P_4$, as in the case of FIG. 1, are expressed by the binary numbers ranging from "0 0 0 0 0" to "1 0 1 1 1" with data $D_0$ of numerical code "0 0 0 0 0" as the fundamental data.

Now, the numerals 3!, 2!, and 1! are defined as the first, second and third weight constants respectively. The results of examination as to the units of each of the weight constants, in the order of magnitude, contained in the numerals of the numerical codes representing the data $D_0$ to $D_{23}$ are as shown in FIG. 3. In the case of data $D_{15}$, for instance, the binary number "0 1 1 1 1" or 15 in decimal number contains two units of the first weight constant 3!. The remainder of 15, that is, $15 - 3! \times 2 = 3$ contains 1 second weight constant 2! and further the remainder thereof, that is, $15 - 3! \times 2 - 2! = 1$ contains 1 third weight constant 1!.

The diagram of FIG. 4a, on the other hand, shows a matrix comprising elements *dij* derived from the element signals $P_1$ to $P_4$, in which the elements signals $P_1$ to $P_4$ are arranged in the dimension of a row and the time sequences $t_1$ to $t_4$ in the dimension of a column. The matrix of FIG. 4a illustrates the fundamental matrix of the fundamental data $D_0$ in which the diagonal elements are all "1" and the other elements "0".

The fundamental data of the permutation code based on this fundamental matrix is defined as the numerical code "0 0 0 0 0". Under these conditions, explanation will be made below as to which numerical code of the data $D_1$ to $D_{23}$ corresponds to which of the permutation codes comprising the element signals $P_1$ to $P_4$.

If a matrix is a modification of the fundamental matrix and contains one "1" signal in each of the rows and columns, it indicates one of the permutations available from the element signals $P_1$ to $P_4$. Therefore, if the fundamental matrix is modified according to a rule associated with the numerals of numerical codes, it is possible to convert the numerical codes representing data $D_1$ to $D_{23}$ into the permutation codes based on the fundamental data $D_0$. Specifically, such a modification is effected in the manner mentioned below.

First, all the elements in each row of the matrix are shifted to a next row in a direction of the loop of the first row - second row - third row - fourth row and again to the first row. That is, the elements of the first row are shifted to the second row, the elements of the second row to the third row, .... and the elements of the fourth row to the first row. Such a shift is applied to the matrix the number of times whose number is equal to the number of units of the first weight constant contained in the numeral of the concerned numerical code representing the data shown in FIG. 3. Consequently, all the elements in each row of the original matrix as shown in FIG. 4a are shifted to a row which is the *n*-th row from the each row in a direction of the above loop, where *n* is equal to the number of units of the first weight constant contained in the numeral of a concerned numerical code. This is called the first shift. On completion of the first shift, the second shift is effected in such a manner that the matrix part excluding the first column and the row containing "1" in its first columns is shifted in the same direction as the first shift by the number times whose weight is equal to the number of units of the second weight for the concerned numerical code. In like manner, in performing the third shift, that part of the matrix excluding the first and second columns and the rows including "1" in their first or second columns is shifted as many times as the number of units of the third weight constant on completion of the second shift.

As an example, explanation will be made below with reference to data $D_{15}$ in the form of the numerical code "0 1 1 1 1" or 15 in decimal number shown in FIG. 3. The result of the first shift is shown in FIG. 4b in which the shift of the elements of the fundamental matrix is carried out two times, since the numeral of $D_{15}$ includes as shown in FIG. 3 two units of the first weight constant 3!, and thereby the elements in each row of the fundamental matrix are located, in a new matrix as shown in FIG. 4b, at a row which is the second row apart from each row. Next, the second shift is effected in such a manner that the part of the matrix surrounded by dashed lines in FIG. 4b excluding the first column and the row containing "1" in its first column, that is, the part of the matrix shown collectively in FIG. 4b' is shifted by one row that is as many times as the number of units of the second weight constant, resulting in the matrix as shown in FIG. 4c. Finally, as the third shift, that part of the matrix excluding the first and second columns and those rows having "1" in their first and second columns, as shown surrounded by dashed lines in FIG. 4c, that is, the part of the matrix collectively shown in FIG. 4c', is shifted by one row that is equal in number to the number of units of the third weight constant, resulting in the matrix shown in FIG. 4d.

Thus, the matrix conversion based on the fundamental matrix by shifts associated with the number of the weight constants is completed.

Thus, the data $D_{15}$ is converted to a permutation of the element signals, i.e. "$P_3$, $P_1$, $P_4$, $P_2$", given by a matrix as shown in FIG. 4d.

By performing a similar matrix change, it is possible to obtain other data corresponding to one of the permutation codes comprising the element signals $P_1$, $P_2$, $P_3$ and $P_4$. As a result, a numerical code can be converted into a permutation code by detecting the number of each weight constant contained in the numeral of the particular numerical code and by changing the fundamental matrix according to a shift rule associated with the number of the weight constant. In this connection, the weight constants may be defined as $(m - 1)!$, $(m - 2)!$, ....., 2!, 1!, where $m$ is the number of the element signals, so that the weight constants in the case of four element signals involved are 3!, 2!, 1!.

In the foregoing description, efforts have been made to facilitate the understanding of the present system by referring to the case in which a binary code comprises 5 bits and a numerical code is converted into a permutation code represented by the permutation of four different element signals. In addition to this, it is possible to convert a binary code having $n$ bits ($n$ being 2, 3, 4, .....) into a permutation code derived from the permutation of $m$ different signals ($m! \geq 2^n$). In this case, the weight constants $(m - 1)!$, $(m - 2)!$, ......, 2!, 1! must be set in binary codes.

Further, a binary-coded decimal code may be converted into a permutation code derived from the permutation of $m$ different signals ($m \geq 10^{n/4}$), even though it is necessary that the weight constants be set in binary-coded decimal codes.

Explanation will made now of the fundamental operating principle of the invention with reference to the converter for converting a permutation code into a numerical code at the receiving end.

For the sake of simplicity, reference will be made to the case, as in the foregoing description of the transmitter operating principle, where a permutation code derived from the time sequence of the four frequencies $f_1$ to $f_4$ is converted into a binary code.

Assuming that, among the data shown in FIG. 3, the element signals $P_2$, $P_1$, $P_4$ and $P_3$ making up a permutation code corresponding to data $D_{11}$ are received in the shown order, the resulting matrix will be as shown in FIG. 5b, the fundamental matrix being shown in FIG. 5a involving the four element signals $P_1$ to $P_4$. The converter at the receiving end is such that in order to match the matrix of the received data $D_{11}$ with the fundamental matrix, the detection is made as to how many times the bit "1" in each row of the data $D_{11}$ must be shifted and the number of shifted rows in each column is multiplied by the weight constants mentioned above, so that their sum is indicated in the form of a binary code or a binary-coded decimal code.

The matrix representing the data $D_{11}$ is shifted in the manner mentioned below so as to be matched with the fundamental matrix shown in FIG. 5a. The first shift relates to "1" in the first row and first column of the fundamental matrix. In like manner, the shifting procedures are carried out successively with reference to "1" in the second row and second column, the third row and third column, and the fourth row and fourth column, respectively, of the fundamental matrix. The first shift is carried out to shift the elements in row position in a direction of the loop of the fourth - third - second - first and to the fourth row, the second and subsequent shifts being performed in like manner. In the following description, "1" in the fundamental matrix on which the $i$-th shift is to be concentrated will be called the $i$-th "1".

The first shift covers the whole matrix, whereas the second and subsequent shifts, that is, the $i$-th shift where $i$ is not less than 2 are concerned with only that part of the matrix excluding the rows and columns among the first to ($i$-1)th ones containing "1".

In the first shift for data $D_{11}$, the whole matrix is shifted by one row, with the result that as shown in FIG. 5c "1" in the first column takes the position of the same first-row and first-column as the fundamental matrix of FIG. 5a.

In the second shift, the part of the matrix excluding the first row and first column containing the first "1", that is, the part of matrix shown surrounded by a dashed line in FIG. 5c is shifted in loop way through the fourth row, third row, second row and fourth row in that order. In this case, the shifting by two rows causes the bit "1" in the second column to assume the same position of second row and second column as the fundamental matrix as shown in FIG. 5d.

In similar fashion, the third shift is effected in such a manner that the matrix part surrounded by a dashed line in FIG. 5d is shifted by one row, with the result that the bits "1" in the third and fourth columns both take the same position as in the fundamental matrix.

In this way, the matrix for data $D_{11}$ is required to be shifted by one row, two rows and one row in the first, second and third shifts respectively. The number of shifts required to be effected for each data $D_0$ to $D_{23}$ is shown in FIG. 3.

It will be seen from FIG. 3 that if four frequency signals are involved, the first shift is effected a maximum of 3 times, the second shift a maximum of 2 times and the third shift once, thereby making it possible to identify each data by a combination of the numbers of shift.

Therefore, the number of the first shifts is multiplied by the weight constant 3!, the number of the second shifts by the weight constant 2!, and the number of the third shifts by the weight constant 1!, and by making a total of them, it is possible to indicate the data from $D_0$ to $D_{23}$ by means of decimal numbers from 0 to 23.

As a result, if the multiplication of the weight constants and the addition to obtain the total are performed by the use of binary codes or binary-coded decimal codes, a data in the form of permutation code can be converted into a binary code or a binary-coded decimal code.

Apart from the fundamental operating principle of the invention, it should be noted that the above-described converters for both the transmitter and receiver are included in a single data transmission system. This will be apparent in view of the fact that successful data transmission cannot be accomplished by the provision of the converter according to the invention only at the transmitting or receiving end.

Explanation will be made below of the invention as embodied at the transmitting end of the data transmission system with reference to FIG. 6.

Figure 7:
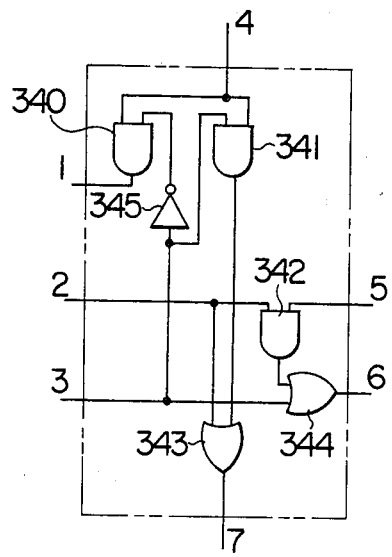
FIG. 7 is a block diagram showing an actual example of the bypass circuits included in FIG. 6.
Figures 10, 12:
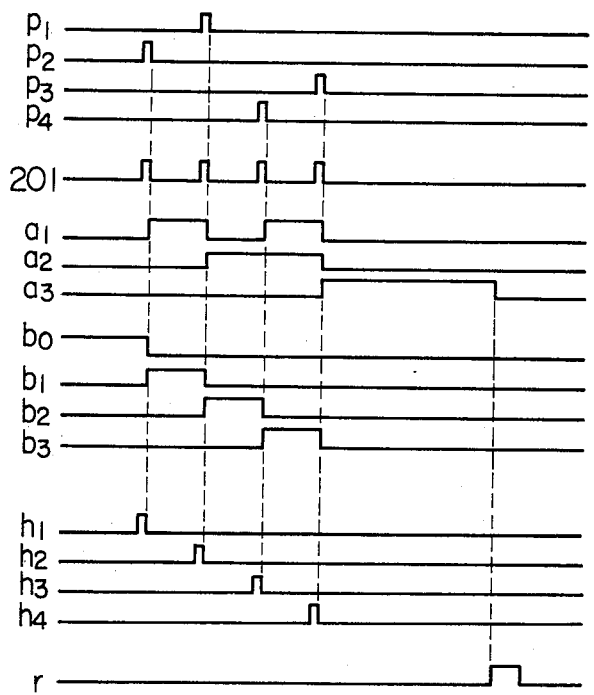
FIG. 10 is a table for explaining the operation of the binary counter and decoder shown in FIG. 6.
FIGS. 12 and 13 show time charts for explaining the operation of the converter device at the receiving end shown in FIG. 11.

Referring to FIG. 6 showing the case in which the numerical code "1 0 1 1 1" or 23 in decimal number is converted into a permutation code, reference numeral 101 shows a monostable circuit for generating a single pulse signal at the output terminal Q when the input signal in the state of "1" is applied thereto, and numerals 102 and 111 AND gates which are controlled by the ouputs from the terminals Q and Q of the monostable circuit 101. Numerals 112 and 117 show OR gates, numerals 118 and 120 weight constant setting circuits for setting the binary numbers "1 1 0", "0 1 0" and "0 0 1" corresponding to the predetermined weight constants 3!, 2! and 1! respectively, numerals 121 to 129 AND gates and numerals 130 to 132 OR gates. The AND gates 121 and 129 and OR gates 130 and 132 select one of the weight constant setting circuits 118 to 120 and picks up the binary number associated therewith in the form of $w_1$, $w_2$, $w_3$ of the numerical signals w, in response to a control signal produced by the control signal generator circuit 200 which will be described later. Numeral 133 shows a shift register and numeral 134 a comparator circuit for making comparison between output value $v$ of the shift register 133 and the numerical value $w$, and signals $w_4$ and $w_5$ being always "0" as they are grounded, which comparator circuit produces a decision signal h in the state of "1" at the output terminal H when $v$ is not less than $w$, whereas it produces a "0" signal when $v$ is less than $w$. Numerals 135 to 139 show inverter circuits for producing a complement of 1 in numerical signal $w$. Numeral 140 shows a 5-bit parallel adder having augend input terminals $A_1$ to $A_5$ to which the outputs $v_1$ to $v_5$ of the shift register 133 are applied respectively, while the complements of the numerical signals $w_1$ to $w_5$ are applied to the addend input terminals $B_1$ to $B_5$. The parallel adder 140 effects subtraction with the numerical value $v$ as a minuend and with numerical value $w$ as a subtrahend, so that the result of subtraction is produced at the output terminals $\Sigma_1$ to $\Sigma_5$ in the form of numerical signals $q_1$ to $q_5$ respectively and applied to the shift register 141. The above-mentioned component elements having reference numerals on the order of 100 make up a weight constant subtractor 100. Numeral 201 shows a set-reset flip-flop, numeral 202 two-phase clock signal generator circuit for generating clock signals $\phi_1$ and $\phi_2$ produced at different time points, numerals 203 and 205 AND gates and numeral 206 a frequency divider circuit including two flip-flop circuits for reducing the clock $\phi_2$ from the clock signal generator circuit 202 to ¼ in frequency. Numeral 207 shows a binary counter for counting the divider output of the frequency divider 206, and numeral 208 a decoder which produces outputs $d_0$ to $d_4$ in the logical relations as shown in FIG. 10 in response to the counted output signals $g_1$ to $g_3$ produced by the binary counter 207, the output $d_0$ of the decoder 208 being left unused. Numeral 209 shows a monostable circuit, and numeral 210 a J-K master slave flip-flop circuit. The outputs produced at the Q and Q terminals of the monostable circuit 209 are applied respectively to the J and K terminals of the J-K flip-flop circuit 210, the clock input terminal c being connected to the J terminal. The output produced at the Q terminal of the J-K flip-flop circuit 210 is applied to the AND gate 205. Numerals 211 to 219 show AND gates, of which the AND gates 211 to 213 produce "1" signals as a logical product of the decision signal h of the comparator circuit 134 and the outputs $d_1$ to $d_3$ of the decoder 208. The AND gates 214 to 216, on the other hand, open their gates and allow the clock signal $\phi_1$ to pass therethrough when the output of the AND gates 211 to 213 is in the state of "1". In like manner, the AND gates 217 to 219 open their gates thereby to allow the clock signal $\phi_2$ to pass therethrough in the presence of "1" output signals from the AND gates 211 to 213. Numerals 220 and 221 show OR gates, numerals 222 to 224 inverter circuits and numerals 225 to 227 AND gates, a control signal generator being made up of the above-described component elements with reference numerals on the order of 200 attached thereto. Numerals 301 to 316 show J-K flip-flops for clock synchronization each of which has a clock input terminal C, an input terminal S, a reset terminal R and an output terminal Q. Among these flip-flops, the J-K flip-flops 301, 306, 311 and 316 have no reset terminal R but have a preset terminal V. Numerals 317 to 328 show bypass circuits such as typically shown in FIG. 7. In FIG. 7, numerals 340 to 342 show AND gates, numerals 343 and 344 OR gates, and numeral 345 an inverter circuit, numerals (1) to (7) showing input and output terminals. In this arrangement, an input signal to the terminal (4) is led to the terminal (1) when the input to terminal (3) is "0", while it is applied to the terminal (7) when the input to the terminal (3) is in the state of "1". The terminal (2) is supplied with the output signal produced at the output terminal Q of a corresponding one of the J-K flip-flos 305 to 316 so as to produce an output signal at the terminal (7). Also, an output signal is produced at the terminal (6), when input signals are applied to both the terminals (2) and (5) or when an input signal is applied to the terminal (3).

Turning back to FIG. 6, reference numerals 329 to 336 show AND gates, of which the AND gates 333 to 336 are supplied with the outputs from the terminals (6) of the bypass circuits 325 to 328 and produce an output when the timing gate signal k produced from the gating timer 400 is in the state of "1". Numerals 337 to 339 show OR gates, the outputs of which are applied to the clock pulse input terminals c of the J-K flip-flops 305 to 308, 309 to 312 and 313 to 316, respectively. The above-mentioned component elements with reference numerals on the order of 300 make up a matrix changer 300.

Reference numeral 401 shows a gating timer circuit for generating a timing gate signal k, and numerals 402 and 403 a binary counter and a decoder similar to the binary counter 207 and 208 respectively. The decoder 103 produces outputs $j_1$ to $j_4$ in the logical relations as shown in the table of FIG. 10 in response to the outputs $i_1$ to $i_3$ of the decoder 103 and the binary counter 402, the output $j_5$ being produced as a differentiated pulse at the fall time of the output $j_4$. By the way, the outputs of the binary counters 207 and 402 and those of the decoders 208 and 403 in FIG. 9 having the same suffixes correspond to each other. Reference numeral 404 shows a monostable circuit, and numerals 405 to 409 OR gates, the output of the OR gate 405 taking the form of reset signal r. Reference numeral 401 shows an AND gate the output of which takes the form of the timing gate signal k. The above-described component elements with the reference numerals on the order of 400 make up a gating timer. Reference numeral 7 shows a change-over switch, numeral 8 a reset switch, numeral 9 input terminals for numeral code U, and numeral 10 output terminals for the permutation code P.

Figure 9:
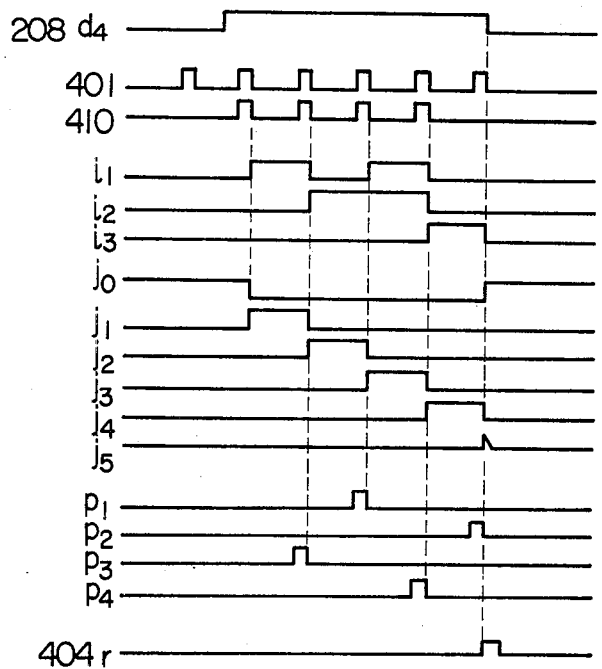
FIGS. 8 and 9 show time charts for explaining the operation of the circuit of FIG. 6.
Figure 8:
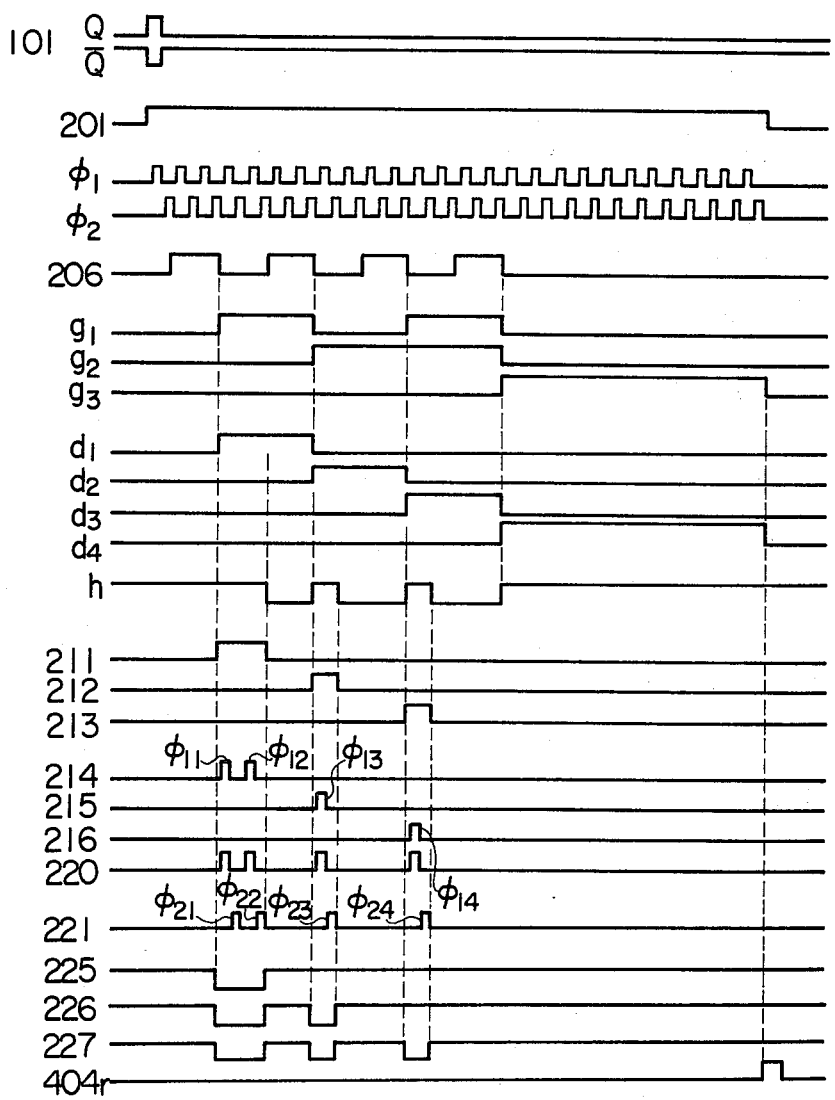

The operation of the circuit shown in FIG. 6 will be explained with reference to the time charts of FIGS. 8 and 9.

First, the reset switch 8 is closed to the positive side thereby to generate a reset signal r; the flip-flop circuits 201 and 210, the binary counters 207 and 401 and the J-K flip-flop circuits 301 to 316 excepting 301, 306, 311 and 316 are reset; and the J-K flip-flop circuits 301, 306, 311 and 316 are set by way of the preset terminal V. After that, the reset switch 8 is closed to the side at the earth potential.

The explanation will be made below with reference to FIG. 8 about the operation by which the data comprising numeral signals $u_5$ to $u_1$ to the binary code applied to the input terminal 9 are converted into a matrix including the element signals $P_1$ to $P_4$ in the dimension of a row and the time sequences $t_1$ to $t_4$ in the dimension of a column as mentioned already and stored in the flip-flop circuits 301 to 316. For the purpose of explanation, data $D_{15}$ will be taken up as an example.

When the change-over switch 7 is closed to the side of positive potential, the monostable circuit 101 produces a "1" signal at its Q output terminal for a certain period of time. During the time when the output at the Q terminal of the monostable circuit 101 is in the state of "1", the numerical code $u_5$ to $u_1$ or "0 1 1 1 1" applied to the input terminal 9 is applied through the AND gates 102, 104, 106, 108, 110 and through the AND gates 112 to 116, to the input terminal of the shift register 133, which reads a numerical code when the output from the Q terminal of the monostable circuit 101 is applied to the input terminal c through the OR gate 117. As a result, the output signals $v_5$ to $v_1$ of the shift register 133 become "0 1 1 1 1" like the numerical code $u_5$ to $u_1$ applied to the input terminal 9. After that, the changeover switch 7 is closed to the earth potential side.

On the other hand, when the output at the Q terminal of the monostable circuit 101 becomes "1", the flip-flop circuit 201 is set and produces a "1" signal, thus permitting the clock signals $\phi_1$ and $\phi_2$ of the clock signal generator circuit 202 to pass through the AND gates 203 and 204. Under this condition, the J-K flip-flop 210 is in the set state due to the fact that the reset switch 8 is reset as it is closed to the positive potentital side, thus producing a "1" signal at the Q terminal. The clock signal $\phi_2$ which has passed through the AND gate 204 is applied through the AND gate 205 to the frequency divider circuit 206 thereby to effect frequency reduction to ¼. The frequency-divided pulses from the frequency divider circuit 206 are applied to the input terminal c of the binary counter 207 for the counting operation. When the count signals $g_3$ to $g_1$ of the binary counter 207 become "0 0 1", the output signals $d_0$ and $d_2$ to $d_4$ of the decoder 208 become "0" and the signal $d_1$ "1", as shown in the table of FIG. 10, thus opening the AND gates 121, 124 and 127, with the result that the weight constant setting circuit 118 is selected. The setting "1 1 0" stored in the weight constant setting circuit 118 takes the form of numerical signals $w_3$ to $w_1$ through the AND gates 121, 124 and 127 and the OR gates 130 to 132, so that the numerical signal $w$ is "0 0 1 1 0". Since the numerical signal $w$ of "0 0 1 1 0" is larger than the numerical signal $v$ of "0 1 1 1 1" of the shift register 133, the comparator circuit 134 produces a decision signal $h$ in the state of "1".

The parallel adder 140 effects a subtracting operation with the numerical signal $w$ as the subtrahend and the numerical signal $v$ as the minuend, so that the result of subtraction $q_5$ to $q_1$ becomes "0 1 0 0 1".

The output signals $d_1$ to $d_3$ of the decoder 208 are applied to the AND gates 211 to 213 respectively. In view of the fact that the output $d_1$ of the decoder 208 is "1", the AND gate 211 produces a "1" signal when the decision signal $h$ of the comparator circuit 134 becomes "1". As a result, the AND gate 214 is opened, so that the clock signal $\phi_1$ which has passed through the AND gate 203 is applied through the OR gate 220 to the input terminal c of the shift register 141. The shift register 141 is provided for reading and storing the result of operation "0 1 0 0 1" of the parallel adder 140 in response to the clock signal $\phi_1$ applied to the input terminal c.

The flip-flop circuits 301 to 316 arranged to form a matrix are reset or preset by the reset signal $r$ through the reset switch 8, so that the output signals at the Q terminals of the flip-flip circuits 301, 306, 311 and 316 corresponding to the diagonal elements are in the state of "1", while the output signals produced at the Q terminals of the other flip-flop circuits are in the state of "0". Thus the fundamental matrix as shown in FIG. 4a is stored in the flip-flop circuits 301 to 316.

Of the flip-flop circutis 301 to 316 thus storing the fundamental matrix, the flip-flop circuits 301 to 304 have their input terminals c impressed with clock signal $\phi_1$ ($\phi_{11}$) which has passed through the AND gate 214. Also, the clock signal $\phi_1$ which has passed through the AND gate 214 is applied to the input terminals c of the flip-flop circuits 305 to 316 through the OR gates 337 to 339 respectively.

Under these conditions, the binary counter 402 is in a reset state with its outputs $i_1$ to $i_3$ in the state of "0", while the output signal $j_0$ of the decoder 403 is "1" and the signals $j_1$ to $j_5$ "0" as shown in FIG. 10. Further, the output of the OR gates 406 to 409 are "0", while the OR gates 406 to 409 and the AND gates 329 to 332 produce "0" signals.

Therefore, the bypass circuits 317 to 328 are in the state as follows: First, as to the bypass circuits 317 to 320 provided for the flip-flop circuits 305 to 308 in the second column, the input to the terminals 3 of the bypass circuits 317 to 320 as shown in FIG. 7 is "0" because the AND gates 329 to 332 produce the outputs in the state of "0", so that the AND gate 341 does not open and is impressed with the output of the inverter circuit 345. On the other hand, the AND gate 340 is open, with the result that the input at the terminal 4 is applied through the terminal 1 to the input terminals S of the flip-flop circuits 301 to 304. Also, since the input to the terminal 5 is "0", the input to the terminal 2 is introduced to the terminal 7 through the OR gate 313, the output at the terminal 7 being applied to the terminal 4 of the bypass circuit in the next row. When corresponding outputs at the Q terminals of the flip-flop circuits 305 to 308 are in the state "1", the flip-flop circuit in the next row is set.

The above-mentioned fact is also the case with the bypass circuits 321 to 328 provided for the flip-flop circuits 309 to 316 in the fourth column.

In this state, the application of the clock pulse $\phi_{11}$ to the flip-flop circuits 301 to 316 causes the information stored therein to be shifted by one bit in a loop way through 301, 302, 303, 304, 301, 305, 306, 307, 308, 305, 309, 310, 311, 312, 309, 313, 313, 315, 316 and 313 in that order, resulting in "1" signals being produced at the Q output terminals of the flip-flop circuits 302, 307, 312 and 313.

After the lapse of a certain time, the Q terminal of the monostable circuit 101 produces a "0" output and the Q terminal thereof a "1" signal. The AND gates 103, 105, 107, 109 and 111 open their gates thereby to connect the output terminal of the shift register 141 to the input terminal of the shift register 133. Under this condition, the output $d_1$ of the decoder 208 is in the state of "1", thereby causing the AND gate 221 to produce a "1" signal. The AND gate 219 opens and the clock signal $\phi_2(\phi_{21})$ is applied to the input terminal c of the shift register 133 through the OR gates 221 and 117. The application of the clock signal $\phi_2$ to the shift register 133 causes the same to read and store the information stored in the shift register 141. In other words, the information stored in the shift register 133 becomes "0 1 0 0 1".

The comparator circuit 134 is for comparing the numerical signal $v$ in the form of "0 1 0 0 1" from the shift register 133 with the numerical signal $w$ in the form of "0 0 1 1 0". Since $v$ is larger than $w$, the decision signal $h$ remains in the state of "1". Under this condition, the output $d_1$ of the decoder 208 is "1", and the output of the AND gate 211 is also in the state of "1", so that the AND gate 214 opens, with the result that the clock signal $\phi_1(\phi_{12})$ is applied to the input terminal c of the shift register 141, which reads the result of operation of the parallel adder 140. In the meantime, the operational result of the parallel adder 100 is "0 0 1 1 1".

The second clock signal $\phi_1(\phi_{12})$ which has passed through the AND gate 214, on the other hand, is applied to the input terminals c of the flip-flop circuits 301 to 316, thereby shifting the information stored therein. The flip-flop circuits 303, 308, 309 and 314 are set and produce at their Q output terminals "1" signals, while the output at the Q terminals of the other flip-flop circuits becomes "0". At this time, the output of the flip-flop circuits 301 to 316 corresponds to the matrix following the first shift as shown in FIG. 4b.

In this way, the information stored in the flip-flop circuits 301 to 316 arranged to form a matrix is set in a fundamental matrix as shown in FIG. 4a by the first reset operation, and after that a subtracting operation is performed in the weight constant subtractor 100 with the first weight constant "0 0 1 1 0" as a subtrahend and with the numeral "0 1 1 1 1" of data $D_{15}$ expressed in a numerical code as a minuend. The number of times of the subtraction is detected as the number of the pulse signal $\phi_1$ obtained from the AND gate 214, so that the information stored in the flip-flop circuits 301 to 316 is shifted by a couple of rows thereby to convert the matrix into the one shown in FIG. 4b. In other words, the shifting has been made by the quotient obtained by dividing the numeral "0 1 1 1 1" by the weight constant "0 0 1 1 0".

The result of subtraction that is "0 0 0 1 1"read by the shift register 141 is read by the shift register 133 by way of the second clock signal $\phi_{22}$ obtained from the OR gate 221.

This numeral "0 0 0 1 1" is smaller than "0 0 1 1 0" of the numerical signal $w$ and therefore the decision signal $h$ of the comparator circuit 134 becomes "0". The AND gate 211 also produces a "0" signal, thus completing the first shift.

When the frequency divider circuit 206 produces the second frequency-divided output, the outputs $g_3$ to $g_1$ of the binary counter 207 become "0 1 0", while the decoder 208 produces a "1" output only at the output $d_2$ as shown in FIG. 10. The output $d_2$ of the decoder 208 is used to open the ANd gates 122, 125 and 128 thereby to select the weight constant setting circuit 119, which is set at "0 1 0". As a result, the numerical signal $w$ applied to the comparator circuit 134 becomes "0 0 0 1 0". Under this condition, "0 0 0 1 1" is stored in the shift register 133 due to the first shift.

The comparator circuit 134 compares "0 0 0 1 1" of the numerical signal $v$ with "0 0 0 1 0" of the numerical signal $w$ and produces the decision signal $h$ in the state of "1" since $v$ is larger than $w$, with the result that a "1" signal is produced by the AND gate 212. The "1" signal of the AND gate 212 opens the AND gates 215 and 218. The clock signal which has passed through the AND gate 215 is applied to the input terminal $c$ of the shift register 141, so that the shift register 141 reads and stores "0 0 0 0 1" that is the result of subtraction by the parallel adder 140. In the meantime, the monostable circuit 210 produces a "1" signal at its $\overline{Q}$ output terminal, so that the value "0 0 0 0 1", that is, the information stored in the shift register 141 is read by the shift register 133 through the clock signal $\phi_{23}$. The numeral "0 0 0 0 1" thus stored in the shift register 133 is smaller than "0 0 0 1 0" of the numerical signal $w$, and therefore the comparator circuit 134 produces the decision signal $h$ in the state of "0". As a result, the output of the AND gate 212 also becomes "0", thus completing the subtracting operation for the setting "0 0 0 1 0" (2!).

When the output of the AND gate 212 becomes "1", on the other hand, the AND gate 225 produces a "1" output. This is because the output of the AND gate 211 is "0", that of the inverter circuit 222 is "1" and the output $j_0$ of the decoder 403 is "1". By the way, the outputs of the AND gates 226 and 227 are "0". The output of the AND gate 225 is applied through the OR gate 406 to the AND gates 329 to 332. In the meantime, the outputs $j_1$ to $j_4$ of the decoder 403 are in the state of "0", and among the flip-flop circuits 301 to 304 constituting the first column of the matrix, only the flip-flop circuit 303 produces a "1" signal at its Q output terminal by the first shift. As a result, the AND gate 331 produces a "1" signal, which is applied to the terminal 3 of the bypass circuit 319. This input "1" signal to the terminal 3 of the bypass circuit 319 is introduced to the terminal 6 through the OR gate 344 shown in FIG. 7. In like manner, the input to the terminals 3 of the bypass circuits 323 and 327 become "1" thereby to produce a "1" signal at the terminals 6. As a result, the bypass circuits 319, 323 and 327 open the AND gate 341 shown in FIG. 7, so that the input to the terminal 4 is introduced to the terminal 7. This means that a bypass circuit is working for the flip-flop circuits 307, 311 and 315.

Under this condition, "0" signals are produced from the other AND gates 329, 330 and 332 as well as from the OR gates 407 to 409, and therefore the input signal to the terminals 5 of the bypass circuits 317 to 328 is also in the state of "0". The bypass circuits other than 319, 323 and 327 produce "0" signals at their terminals 6 while "0" signals are applied to their input terminals 3. The input signal applied to the terminal 4 is introduced through the AND gate 340 to the terminal 1 and further to the input terminal S of a corresponding flip-flop circuit. Also, the output produced at the Q terminal of the corresponding flip-flop circuit is applied to the terminal 2 and introduced through the OR gate 343 to the terminal 7.

While the control signal generator circuit 200 is in the above-mentioned state, the clock signal $\phi_1(\phi_{13})$ which has passed through the AND gate 215 is applied through the OR gates 337 to 339 to the input terminals $c$ of the flip-flop circuits 305 to 316 making up the second to fourth columns of the matrix. The flip-flop circuits 305 to 316 shift their stored information by one row to the flip-flop circuits in the next stage in response to the clock signal $\phi_{13}$. Since the bypass circuits 319, 323 and 327 are formed, the information stored in the flip-flop circuits 306, 310 and 314 shifts by one row to the flip-flop circuits 308, 312 and 316 respectively. In other words, the information is shifted by one bit in a direction of the loop through the flip-flop circuits 305, 306, 308 and 305; 309, 310, 312 and 309; and 313, 314, 316 and 313 in that order.

This means that the information stored in the flip-flop circuits forming the matrix part surrounding by the dashed lines in FIG. 4b, that is, the matrix part collectively shown in FIG. 4b' is shifted by the number equivalent to the second weight constant 2!.

As the result of the second shift, the information stored in the flip-flop circuits 301 to 316 takes the form of the matrix as shown in FIG. 4c, thus completing the second shift.

The third shift begins with the generation of the third frequency-divided pulse by the frequency divider circuit 206. This third frequency-divided pulse produced from the frequency divider circuit 206 causes the output $g_3$ to $g_1$ of the binary counter 207 to be put into the state of "0 1 1", so that the decoder 208 produces a "1" signal only at its output $d_3$. The AND gates 123, 126 and 129 open thereby to select the weight constant setting circuit 120.

The value "0 0 0 1" of the numerical signal $w$ is applied to the comparator circuit 134. On the other hand, the value "0 0 0 1" of numerical signal $v$ is stored in the shift register 133 by the second shift, so that the comparator circuit 134 produces the decision signal $h$ in the state of "1" since $v$ is equal to $w$.

Even though the decision signal $h$ is applied to the AND gates 211 to 213, the output of the AND gate 213 becomes "1" since only the output $d_3$ of the decoder 208 is in the state of "1", thus opening the AND gates 216 and 217.

The parallel adder 140, on the other hand, effects the subtraction of the numerals $v$ and $w$ from each other and as a result, $g_5$ to $g_1$ are produced in the form of "0 0 0 0".

When the AND gate 216 opens, the clock signal $\phi_1(\phi_{14})$ is applied to the input terminal $c$ of the shift register 141, which in turn reads and stores the result of operation "0 0 0 0 0" of the parallel adder 140. After that, as in the case of the first and second shifts, the clock signal $\phi_2(\phi_{24})$ which has passed through the AND gate 217 is applied to the input terminal $c$ of the shift register 133 with the result that the information stored in the shift register 111 is transferred to the shift register 133. Thus, the numerical value $v$ of "0 0 0 0 0" is decreased below the numerical value $w$ of "0 0 0 0 1". The result is that both the decision signal of the comparator circuit 134 and the output of the AND gate 213 become "0", thus completing the subtracting operation of the weight constant 1!.

When the output of the AND gate 213 is in the state of "1", on the other hand, the outputs of the AND gates 225 and 226 are also in the state of "1" for the reason that the output $j_0$ of the decoder 403 is "1" and therefore the inverter circuits 222 and 223 also produce "1" signals. The output from the AND gates 225 and 226 are introduced to the OR gates 406 and 407.

As of the time when the second shift has been completed, the information stored in the flip-flop circuits 301 to 316 forms the matrix as shown in FIG. 4c. In other words, the flip-flop circuits 303 and 305 making up the first and second columns produce "1" signals at their Q terminals. Since the output of the flip-flop circuit 305 is in the state of "1" at its Q terminal, the input to the terminal 2 of the bypass circuit 317 is also "1". The terminal 5 of the bypass circuit 317 is in the state of "1" due to the output from the AND gate 226. As a result, the AND gate 342 shown in FIG. 7 produces a "1" signal which is applied through the OR gate 344 to the terminal 6. Therefore, both the input to the terminal 3 and the output from the terminal 6 of the bypass circuits 321 and 325 associated with the flip-flop circuits 309 and 313 in the first row change into the state of "1", with the result that the bypass circuits 317, 321 and 325 work.

Incidentally, as to the bypass circuits 319, 323 and 327, they still work as in the second shift since the output of the AND gate 331 is in the state of "1".

Under this condition, the clock signal $\phi_1(\phi_{14})$ which has passed through the AND gate 216 is applied through the OR gates 338 and 339 to the input terminals $c$ of the flip-flop circuits 309 to 316 arranged in the third and fourth columns, thereby effecting a shift by one row. In spite of this, the bypass circuits 321, 323, 325 and 327 are still working as mentioned above.

Actually, therefore, the matrix part surrounded by the dashed lines in FIG. 4c, that is, the matrix part collectively shown surrounded by the dashed line in FIG. 4c' comprising the flip-flop circuits 310, 312, 314 and 316 shifts by one bit in loop way through 310, 312, 310; and 314, 316 and 314, in that order. In other words, the matrix part shown surrounded by the dashed line of FIG. 4c shifts by one bit that is equivalent to the number of the third weight constant 1!. As a result, the information stored in the flip-flop circuits 301 to 316 takes the form of matrix as shown in FIG. 4d, thus completing the third shift.

By the above-described 3-stage shifting operation, the data comprising the numerals $u_5$ to $u_1$ in the form of binary code "0 1 1 1 1" applied to the input terminal 7 is converted into the permutation code as shown in FIG. 4d, including the element signals $P_1$, $P_2$, $P_3$ and $P_4$ in the dimension of row and the time series $t_1$, $t_2$, $t_3$ and $t_4$ in the dimension of column, and then stored in the flip-flop circuits 301 to 316.

Next, the explanation will be made of the operation whereby data in the form of permutation is obtained from the matrix stored in the flip-flop circuits 301 to 316 as mentioned above, with reference to FIG. 9.

The fourth frequency divided pulse produced by the frequency divider circuit 206 causes the outputs $g_3$ to $g_1$ of the binary counter 207 to be put into the state "1 0 0", so that the decoder 208 produces a "1" signal only at its output terminal $d_4$. The state "1" of the output $d_4$ of the decoder 208 causes the output at the terminal Q of the monostable circuit 209 to be put into the state of "1". As a result, the J-K flip-flop circuit 210 is set and produces a "0" signal at its $\overline{Q}$ output terminal. The state "0" of the $\overline{Q}$ output terminal of the J-K flip-flop 210 causes the AND gate 205 to be closed, thus preventing the clock signal $\phi_2$ from being applied to the frequency divider circuit 206. The binary counter 207 does not count the frequency divided pulses but continues to hold the state of "1 0 0" of the outputs $g_3$ to $g_1$. Likewise, the output $d_4$ of the decoder 208 is held in the state of "1".

The output $d_4$ from the decoder 208 is applied to the AND gate 410 of the gating timer 400, so that the AND gate 410 is opened.

The gating timer circuit 401 produces a timing gate signal $k$ in pulse form periodically, which timing gate signal $k$ is applied through the AND gate 410 to the clock input terminal $c$ of the binary counter 402. In response to the first-arriving pulse signal $k$, the binary counter 402 produces the output $i_3$ to $i_1$ of "0 0 1". Of the outputs of the decoder 403, $j_1$ is "1" and $j_0$, $j_2$ and $j_5$ are "0" according to the table shown in FIG. 10. When the output $j_0$ of the decoder 403 becomes "0", the outputs of all the AND gates 225 to 227 become also "0". An "0" signal is applied to the terminal 5 of the bypass circuits 317 to 328, and the input to the terminal 3 is introduced to the terminal 6 through the OR gate 344. The output $j_1$ of the decoder 403 is applied to the AND gates 329 to 332 through the OR gate 406. Among the flip-flop circuits 301 to 304 in the first column, the flip-flop circuit 303 produces a "1" signal at its Q terminal, so that the output of the AND gate 331 is put into the state of "1" and applied to the terminals 3 of the bypass circuit 319. It has already been mentioned that the outputs at the terminals 3 of the bypass circuits 319, 323 and 327 are led to the terminals 6 thereof, the output of the AND gate 331 being applied to the AND gate 335. The timing gate signal $k$ is applied to the AND gates 333 to 336. As a result, the element signal $P_3$ is produced at the terminal $P_3$ of the output terminals 10 in synchronism with the first pulse signal $k$ that has passed through the AND gate.

In response to the second-arriving timing gate signal $k$, the binary counter 402 produces outputs $i_3$ to $i_1$ of "0 1 0", so that the decoder 403 produces the output $j_2$ in the state of "1". This output $j_2$ of the decoder 403 is applied through the OR gate 407 to the terminals 5 of the bypass circuits 317 to 320. The input to the terminals 2 of the bypass circuits 317 to 320 are put into the state of "0" as the output of the AND gates 329 to 332 change to "0". The output from the Q terminals of the flip-flop circuits 305 to 308 which is applied to the terminals 2 is introduced through the AND gate 342 and through the OR gate 344 to the terminals 6. In the bypass circuits 321 to 328, on the other hand, the fact that the input to the terminals 5 are in the state of "0" causes the input to the terminal 2 to be led to the terminal 6 through the OR gate 344. As a consequence, the information stored in the flip-flop circuits 205 to 208 in the second column, that is, the indication of the presence or absence of the element signals in the time sequence $t_2$ in the form of "0" or "1" (the output at the Q terminal of the flip-flop circuit 305) is applied through the bypass circuits 317, 321 and 325 to the AND gate 333, and by the second timing gate signal $k$, introduced to the terminal $P_1$ of the output terminals 10. In like manner, as shown in FIG. 9, the information stored in the flip-flop circuit 312 is picked up as an element signal in the time sequence $t_3$ and produced at the $P_4$ terminal as the element signal $P_4$ in synchronization with the third timing gate signal $k$. This is also the case with the fourth timing gate signal $k$, in synchronism with which the element signal $P_2$ in pulse form is produced at the $P_2$ terminal.

In this way, the operating processes are completed in which the matrix including the element signals $P_1$, $P_2$, $P_3$ and $P_4$ stored in the flip-flop circuits 301 to 316 in the dimension of row and time series $t_1$, $t_2$, $t_3$ and $t_4$ in the dimension of column is converted into a chronological permutation of the element signals $P_1$, $P_2$, $P_3$ and $P_4$ (in the order "$P_2$, $P_1$, $P_4$, $P_2$" in the foregoing case).

As soon as the binary counter 402 completes the counting of the fifth timing gate signal, the decoder 403 produces a differential pulse as the output $j_5$, whereby the monostable circuit 404 produces a pulse signal with a predetermined width. The output signal of the monostable circuit 404 takes the form of a reset signal $r$ through the OR gate 405, thereby resetting the system in preparation for the next code change.

It will be understood from the above description that the data "0 1 1 1" in the form of binary code applied to the input terminal 7 is converted into a data in the form of a permutation code comprising a chronological permutation $P_3$, $P_1$, $P_4$, $P_2$ of the element signals $P_1$, $P_2$, $P_3$ and $P_4$.

An actual example of the system according to the invention at the receiving end of the data transmission system will be explained with reference to FIG. 11.

Figure 11:
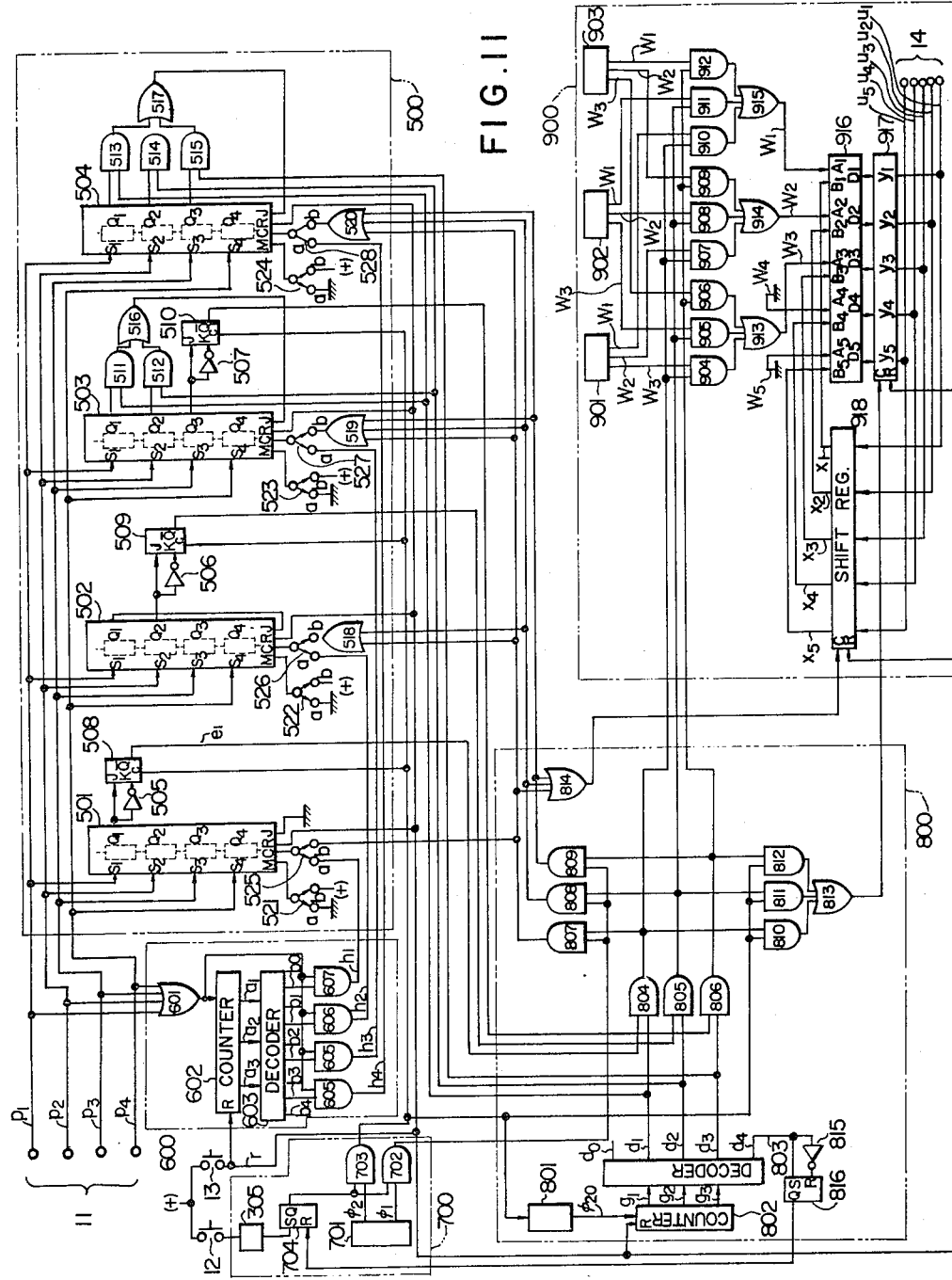
FIG. 11 is a block diagram showing the converter device at the receiving end according to an embodiment of the invention.

In FIG. 11, reference numerals 501 and 504 show shift registers built around four R-S flip-flop circuits such as SN74195 of Texas Instruments, comprising parallel input terminals $S_1$ to $S_4$, parallel output terminals $Q_1$ to $Q_4$, a series input terminal J, a mode selection terminal M, a clock signal input terminal C and a reset terminal R. The shift registers 501 and 504, which permit series input, parallel input and parallel output, are such that the frequency signals $P_1$ to $P_4$ are applied to the parallel input terminals $S_1$ to $S_4$ having the same suffixes, respectively. Numerals 505 and 507 show inverter circuits, and numerals 508 and 510 J-K masterslave flip-flop circuits such as 7473 of Texas Instruments. The J terminals of the J-K flip-flop circuits 508 to 509 are connected to the output terminals $Q_1$, $Q_2$ or $Q_3$ of the shift registers 501 to 503, so that a "1" signal is produced at the output terminal $\overline{Q}$ in synchronism with the clock signal applied to the C terminal when the output at terminals $Q_1$, $Q_2$ and $Q_3$ are in the state of "1". Numerals 511 to 515 show AND gates numerals 516 to 520 OR gates and numerals 521 to 524 mode change-over switches connected to the mode selection terminals M of the shift registers 501 to 504 for switching between the parallel input operation and series shifting operation of the shift registers 501 to 504. Reference numerals 525 to 528 show clock signal change-over switches which a connected to the clock signal input terminals C of the shift registers 501 to 504 respectively and operative interlocked with the mode change-over switches 521 to 524 to select a clock signal according to the mode involved. The above-mentioned component elements with the reference numerals in the order of 500 make up a signal matrix changing circuit 500.

Reference numeral 601 shows an OR gate, numeral 602 a binary counter and numeral 603 a decoder comprising, say, SN74156 of Texas Instruments and an inverter circuit, which produces the outputs $b_0$ to $b_4$ in the logical relations as shown in the table of FIG. 15 in response to the input including the count outputs $a_1$, $a_2$ and $a_3$ of the binary counter 602. Numerals 604 and 607 show AND gates. The afore-mentioned component elements with the reference numerals in the order of 600 make up a gating timer 600.

Reference numeral 700 shows a clock signal generator circuit comprising a clock signal generator 701 for generating clock signals $\phi_1$ and $\phi_2$ which are never overlapped, AND gates 702 and 703, a flip-flop circuit 704 and a monostable circuit 705.

Reference numeral 801 shows a frequency divider circuit comprising a couple of flip-flop circuits for generating pulse signal $\phi_{20}$ which is the result of reducing the frequency of the clock signal $\phi_2$ from the clock signal generator 701 to one half, numeral 802 a binary counter, and numeral 803 a decoder which, like the decoder 603, produces outputs $d_0$ to $d_4$ in the logical relations as shown in the table of FIG. 15 in response to the count outputs $g_1$ to $g_3$ of the binary counter 802. Numerals 804 and 812 show AND gates, numerals 813 and 814 OR gates, numral 815 an inverter circuit, and numeral 816 a flip-flop circuit. The above-described component elements with the reference numerals in the 800 series make up a control signal generator circuit.

Reference numerals 901 to 903 show setting circuits in which binary numbers each comprising three bits corresponding to the weight constants 3!, 2! and 1! are stored respectively. Numerals 904 to 912 show AND gates and numerals 913 to 915 OR gates. Numeral 916 shows a parallel adder comprising add input terminals $A_1$ to $A_5$, augend input terminals $B_1$ to $B_5$ and output terminals $D_1$ to $D_4$ for performing 5-bit parallel addition. This parallel adder 916 may be comprised of a couple of SN7483's of Texas Instruments. By the way, the added input terminals $A_1$ to $A_5$ are superfluous and grounded in such a way that the input thereto is always "0". Numerals 917 and 918 show shift registers of parallel-input parallel-output type comprising a clock signal input terminal C and a reset terminal R. The above-mentioned component elements having the reference numerals in the 900 series make up a weight constant adding circuit 900. Reference numeral 11 shows input terminals for the frequency signals $P_1$ to $P_4$, numeral 12 a starting switch for code change, numeral 13 a reset switch and numeral 14 an output terminal for binary code.

Figure 13:
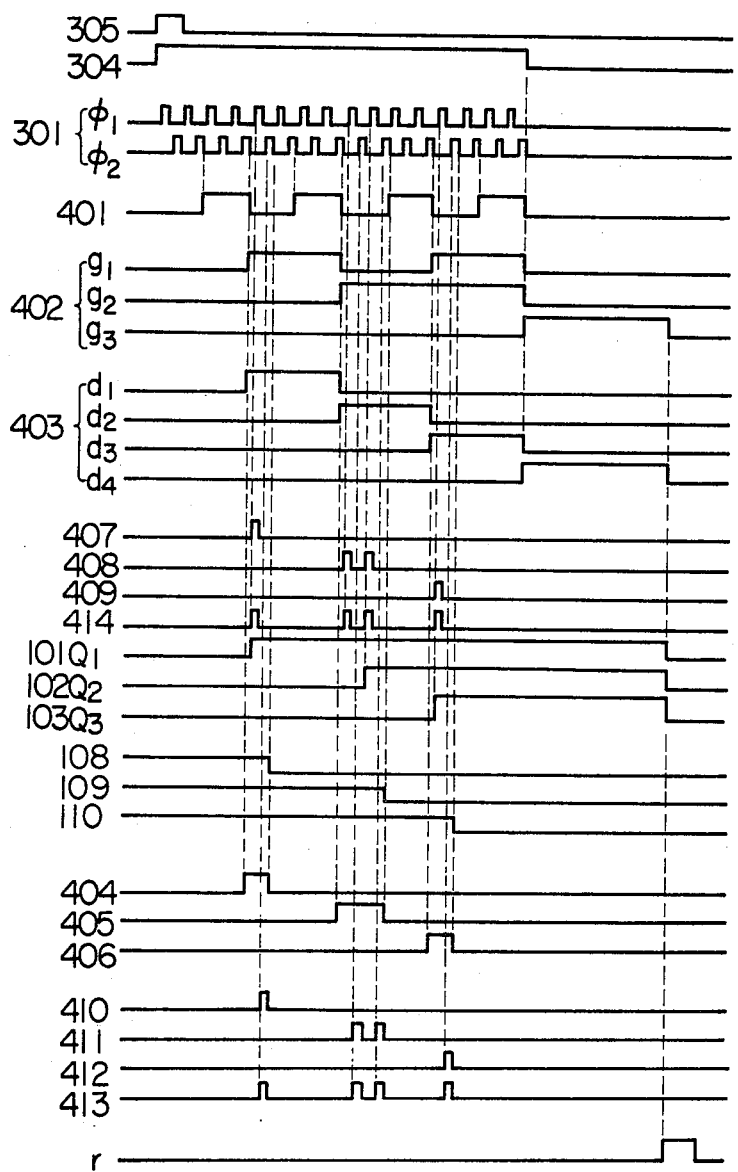

The operation of the above-described circuits will be explained with reference to the time charts shown in FIGS. 12 and 13.

First, the reset switch 13 is closed so as to apply the reset signal $r$ in pulse form to the reset terminals R of the shift registers 501 to 504, 917 and 918 and the binary counters 602 and 802, thus clearing them into the state of "0" ready for operation.

The operation in which the permutation code comprising frequency signals $P_1$ to $P_4$ applied to the input terminal 11 is stored in the shift registers 501 to 504 as a matrix comprising the frequency signals in the rows and the time series in the dimension of column will be explained with reference to the time chart in FIG. 12. By way of explanation, the permutation code signal for data $D_{11}$ will be taken up.

The mode change-over switches 521 to 524 are closed to the $a$ side as shown by dotted lines, thus maintaining the mode selection terminal M in parallel input mode. At the same time, the clock signal change-over switches 525 to 528 are closed to $a$ side, so that the clock signal input terminal C is connected to the AND gates 604 to 607 to which the output of the decoder 603 is applied. Under this condition the binary counter 602 is reset into the "0" state of the outputs $a_1$ to $a_3$, while the output $b_0$ of the decoder 603 is in the state of "1" and $b_1$ to $b_4$ in the state of "0" as shown in FIG. 14.

Upon application of the permutation code signal for data $D_{11}$ to the input terminal 11, the frequency signals $P_1$ to $P_4$ are introduced to the OR gate 601. In the case of data $D_{11}$, the frequency signal $P_2$ arrives first of all and is applied to the binary counter 602 and the AND gates 604 to 607 through the OR gate 601. The frequency signal $P_2$ is applied to the input terminal C of the shift register 501 as an output $h_1$ of the AND gate 607 selected by the output $b_0$ of the decoder 603. In response to a clock signal applied to the input terminal C, the shift register 501 reads the then state of the input terminals $S_1$ to $S_4$, that is, "1" for terminal $S_2$ and "0" for terminals $S_1$, $S_3$ and $S_4$ and also stores "1" at output terminal $Q_2$ and "0" at output terminals $Q_1$, $Q_3$ and $Q_4$. When the frequency signal $P_2$ is applied to the binary counter 602, on the other hand, the binary counter 602 produces count output $a_1$ in the state of "1" and outputs $a_2$ and $a_3$ in the state of "0" at the fall time of the frequency signal $P_2$. As a result, the output $b_1$ of the decoder 203 becomes "1", while the outputs $b_0$, and $b_2$ to $b_4$ are put into the state of "0", as shown in the table of FIG. 14. Upon arrival of the second frequency signal $P_1$ under this condition, the frequency signal $P_1$ is applied to the input terminal C of the shift register 502 as the output $h_2$ of the AND gate 606. The shift register 502 reads and stores the conditions of the frequencyy signals $P_1$ to $P_4$ applied to the input terminals $S_1$ to $S_4$. In this case, the shift register 502 produces a "1" signal at its output terminal $Q_1$ and a "0" signal at its output terminals $Q_2$ to $Q_4$. In like manner, with the arrival of the frequency signals $P_4$ and $P_3$ at the input terminal 6, the shift registers 503 and 504 read and memorize the conditions of the frequency signals $P_1$ to $P_4$ at the respective time of arrival of the two signals. In other words, the output terminal $Q_4$ of shift register 503 becomes "1" and the output terminals $Q_1$ to $Q_3$ "0", whereas the terminal $Q_3$ of the shift register 504 is put into the state of "1" and the terminals $Q_1$, $Q_2$ and $Q_4$ into the state of "0".

In this way, the permutation code "$P_2$, $P_1$, $P_4$, $P_3$" for data $D_{11}$ is stored as a matrix with the frequency signals in the rows and time series in the columns as shown in FIG. 15$b$.

The operation for converting into a binary code the permutation code in the form of a matrix as shown above will explained with reference to the time chart shown in FIG. 13.

The mode change-over switches 521 to 524 are closed to $b$ side at positive potential as shown by the solid lines, whereas the clock signal change-over switches 525 to 528 are closed to $b$ side. As a result, the shift registers 501 to 504 enter the series input shift mode and perform series operation upon application of a clock signal to the input terminal C.

A depression of the code change start switch 12 causes the monostable circuit 705 to produce a pulse signal of a certain width thereby to set the flip-flop circuit 704, whereupon the Q terminal of the flip-flop circuit 704 is put into the state of "1".

The AND gates 702 and 703 are opened so that the clock signals $\phi_1$ and $\phi_2$ from the clock signal generator 701 are allowed to pass therethrough. The clock signal $\phi_2$ is applied to the frequency divider circuit 801 and reduced to one-fourth in frequency, resulting in the pulse signal $\phi_{20}$ being produced from the frequency divider circuit 801. The binary counter 802 produces a "1" signal at its terminal $g_1$ and a "0" signal at its terminals $g_2$ and $g_3$ at the fall time of the pulse signal $\phi_{20}$, that is, at the fall time of the fourth clock pulse signal $\phi_2$ that has passed through the AND gate 703. As a result, the decoder 803 produces, as shown in the table of FIG. 14, a "1" signal at its terminal $d_1$ and "0" signals at its terminals $d_0$, and $d_2$ to $d_4$ thereby to select the AND gate 804. Since the terminal $Q_1$ of the shift register 501 is in the state of "0", on the other hand, the output at the terminal $\overline{Q}$ of the J-K flip-flop circuit 508 is in the state of "1". Therefore, the AND gate 804 produces a "1" signal, while the AND gates 805 and 806 produce "0" signals. The "1" state of the AND gate 804 opens the AND gate 807, to which the clock signal $\phi_1$ which has passed through the AND gate 702 is applied. The clock signal $\phi_1$ which has passed through the AND gate 807 is applied to the input terminal C of the shift registers 501 to 504, which in turn shift the information stored therein by the number of bits contained in the clock signal $\phi_1$ applied to the input terminal C. The output $d_1$ of the decoder 803 is applied to the AND gates 511 and 513 connected to the output terminals $Q_1$ of the shift registers 503 and 504, whereas the output $d_2$ of the decoder 803 is applied to the AND gates 512 and 514 connected to the output terminal $Q_2$. Also, the output $d_3$ of the decoder 803 is applied to the AND gate 515 connected to the output terminal $Q_3$ of the shift register 504. The output of the AND gates 511 and 512 are applied through the OR gate 516 to the series input terminal J of the shift register 503, while the output of the AND gates 513 to 515 are applied through the OR gate 517 to the series input terminal J of the shift register 514. The series input terminal J of the shift register 501 is grounded and always in the state of "0". The output from the output terminal $Q_1$ of the shift register 502 is fed back to the series input terminal J thereof, and therefore the clock signal $\phi_1$ applied by the AND gate 807 shifts the information stored in the shift registers 501 to 504 by the number of the clock pulses $\phi_1$ in loop way through $Q_4$, $Q_3$, $Q_2$, $Q_1$ and $Q_4$ in the order. Upon completion of 1-bit shift in response to the clock signal $\phi_1$ first arriving from the AND gate 807, the information stored in the shift registers 501 to 504 changes from the state shown in FIG. 15*b* to that shown in FIG. 15*c*. When the shift register 501 produces a "1" signal at its $Q_1$ terminal due to the first shift, the output at the $\overline{Q}$ terminal of the J-K flip-flop circuit 508 changes from "1" to "0" at the fall time of the clock signal $\phi_2$ applied to the input terminal C. As a result, the AND gate 804 is closed and produces a "0" signal, so that the AND gate 807 also is closed thereby to prevent the passage therethrough of the clock signal $\phi_1$.

By the above-described first shift, the information stored in the shift register 502 is shifted to $Q_4$, that in the shift register 503 to $Q_3$, and that in the shift register 504 to $Q_2$.

In the meantime, the weight constant add circuit 900 performs the following adding operation: When the output of the AND gate 804 become "1", the AND gates 904, 907 and 910 are opened with the result that the signals representing bits $l_1$ to $l_3$, $l_1$ being "0", $l_2$ and $l_3$ being "1", of the binary number 510 corresponding to the weight constant 3! set in the setting circuit 901 are applied to the addend input terminals $A_1$ to $A_3$ of the parallel adder 916 through the AND gates 904, 907 and 910, and through the OR gates 913 to 915, respectively.

Also, when the AND gate 804 produces a "1" signal, the AND gate 810 is opened, whereupon the clock signal $\phi_2$ which has passed through the AND gate 703 is applied through the OR gate 813 to the input terminal C of the shift register 917. The clock signal $\phi_1$ which is the output from the AND gate 807, on the other hand, is applied to the input terminal C of the shift register 917 through the OR gate 814. By the way, the information stored in the shift registers 917 and 918 is all in the state of "0" as they are reset by the depression of the reset switch 13. Therefore, in spite of the fact that the shift register 918 reads the information stored in the shift register 917 in response to the clock signal $\phi_1$ applied to the input terminal C, the information stored in the shift register 918 remains unchanged because of the all "0" state of the shift register 917. In response to the first-arriving clock signal $\phi_1$, the shift register 917 memorizes $y_1$ to $y_5$ in the form of "0 0 1 1 0" that is the result of addition of the binary number addend "0 0 1 1 0" indicated by $w_1$ to $w_5$ to the binary number augend "0 0 0 0 0" indicated by $x_1$ to $x_5$ by the parallel adder 916. The stored sum "0 0 1 1 0" in the form of signals $u_1$ to $u_5$ is introduced to the output terminal 14. This output $u_1$ to $u_5$ are equivalent to a binary number obtained by multiplying the weight constant 3! in the first shift by 1, that is, the number of bits involved.

In the second shift operation, the decoder 803 produces a "1" signal as its output $d_2$ and "0" signals as its outputs $d_1$, $d_3$ and $d_4$ after the fall of the 8th clock signal $\phi_2$ thereby to select and open the AND gate 805, while at the same time opening the AND gates 512 and 514. Under this condition, the output at the terminal $Q_2$ of the shift register 502 is in the state of "0", and therefore the J-K flip-flop circuit 509 produces a "1" signal at its output terminal $\overline{Q}$. The result is that the output of the AND gate 805 becomes "1" thereby to open the AND gate 808, whereupon the clock signal $\phi_1$ from the clock signal generator 701 is passed through the AND gate 808 and applied to the input terminal C of the shift registers 502 to 504, so that the information stored in the shift registers 502 to 504 is shifted in a direction of the loop through $Q_4$, $Q_3$, $Q_2$ and $Q_4$ in that order. This shift corresponds to the shift along the row in the matrix part shown surrounded by the dashed line of FIG. 15*c*. The result of shifting the information in the shift registers 501 to 504 by two bits in the second shift is shown in FIG. 15*d*. In the state of FIG. 15*d*, the output terminal $Q_2$ of the shift register 502 is in the state of "1", and therefore the J-K flip-flop circuit 509 produces a "0" signal at its Q output terminal. Thus the AND gate 805 produces a "0" signal thereby to complete the shifting operation.

When the AND gate 805 produces a "1" signal by the second shift operation, on the other hand, the AND gates 905, 908 and 911 are opened, so that the binary number "0 1 0" corresponding to the weight constant 2! set in the setting circuit 902 is applied to the addend input terminals $A_1$ to $A_3$ of the parallel adder 916, resulting in the binary number addend "0 0 0 1 0" of the signals $w_1$ to $w_5$. On the other hand, the shift register 918 reads the result of addition "0 0 1 1 0" in the first shift which is stored in the shift register 917 by the first clock signal $\phi_1$ applied while the output of the AND gate 805 is in the state of "1", with the result that the information stored in the shift register 918 becomes "0 0 1 1 0" in the value of $x_1$ to $x_5$. The information thus updated is applied to the augend input terminals $B_1$ to $B_5$ of the parallel adder 916, which in turn adds the addend "0 0 0 1 0" to the augend "0 0 1 1 0". The result of addition $y_1$ to $y_5$ in the form of "0 1 0 0 0" is stored in the shift register 917. The shift register 918 reads the information $u_1$ to $u_5$ in the form of "0 1 0 0 0" stored in the shift register 917 in response to the second clock signal applied in the presence of a "1" output signal from the AND gate 805. In other words, the information "0 1 0 0 0" stored in the shift register 917 is transferred to the shift register 918, whereupon the parallel adder 916 adds "0 1 0 0 0" and "0 0 0 1 0" to each other. The shift register 917 stores the result of addition "0 1 0 1 0" upon application to the input terminal C of the clock signal $\phi_2$. This information "0 1 0 1 0" makes up the sum of the result of calculation in the first shift and the binary number obtained by multiplying the weight constant 2! for the second shift by the shift bit number 2.

After the fall of the 12th clock signal $\phi_2$, the decoder 803 produces a "1" signal as its output $d_3$ and "0" signals as its outputs $d_1$, $d_2$ and $d_4$. Since the output at the terminal $Q_3$ of the shift register 503 is in the state of "0", the output at the terminal Q of the J-K flip-flop circuit 510 is in the state of "1". As a result, the output of the AND gate 806 becomes "1" thereby to open the AND gate 809. The AND gate 515 is open due to the output $d_3$ of the decoder 803. The clock signal $\phi_1$ is passed through the AND gate 809 and applied to the input terminal C of the shift registers 503 and 504, with the result that the information stored in the shift registers 503 and 504 is shifted in a direction of the loop through $Q_4$, $Q_3$ and $Q_4$ in that order. This shift corresponds to the shift in the direction of row in the matrix part shown surrounded by the dashed line of FIG. 15*d*, in which a 1-bit shift causes the information stored in the shift registers 501 to 504 to be given in the form of the fundamental matrix as shown in FIG. 15*a*. With the formation of the fundamental matrix, the shift register 503 produces a "1" signal at its output terminal $Q_3$, whereupon the J-K flip-flop circuit 510 produces a "0" signal at its output terminal Q. As a result, the output of the AND gate 806 becomes "0" thereby to end the shifting operation.

During the third shift mentioned above, when the output of the AND gate 806 becomes "1", the AND gates 906, 909 and 919 are opened, so that the binary number "0 0 1" corresponding to the weight constant 1! in the setting circuit 903 is applied to the parallel adder 916 as an addend input. In response to the clock signal $\phi_1$ applied to the input terminal C through the AND gate 809 and the OR gate 814, the shift register 918 reads the information "0 1 0 1 0" stored in the shift register 917 and applies its output to the parallel adder 916 as an augend. The parallel adder 916 adds "0 1 0 1 0" and "0 0 0 0 1" to each other and produces the sum "0 1 0 1 1" as an output. Shift register 917, on the other hand, stores the sum "0 1 0 1 1" produced by the parallel adder 916 in response to the clock signal $\phi_2$ and introduces the information to the output terminal 14. This value is equivalent to the sum of the result of calculation in the second shift and the binary number obtained by multiplying the shift number 1 by the weight constant 1! in the third shift.

The information "0 1 0 1 1" stored in the shift register 917 makes up the data $D_{11}$ in binary code, thus enabling the permutation code comprising $P_2, P_1, P_4, P_3$ to be converted into a binary code.

In similar way, the permutation codes representing the other data shown in FIG. 3 are capable of being converted into corresponding binary codes.

The foregoing description of the present invention is made to show the conversion from numerical code into permutation code at the data transmitting end or from permutation code into numerical code at the receiving end of a data transmission system when the numerical code representing the data to be transmitted consists of a 5-bit binary code. Such a conversion as mentioned above is also possible in the case of data having 8 bits in the form of a binary-coded decimal code. This possibility will be explained below with reference to the transmitting end of the data transmission system.

Referring again to FIG. 6, the parallel adder 140 is replaced by the one operable on binary-coded decimal numbers, while the shift registers 133 and 141 and the comparator circuit 140 are increased from 3 to 8 bits. Further, AND gates and OR gates are added to the AND gates 102 to 111 and OR gates 112 to 116 respectively by the number corresponding to 3 bits, and the input terminals 9 are increased by three. Also, the weight constant setting circuit and the gates around it are rearranged so as to be able to handle binary-coded decimal numbers, thereby making a conversion possible from a numerical code in the form of binary-coded decimal number into a permutation code.

The foregoing explanation about the conversion through a binary-coded decimal number at the transmitting end also applies with equal effect to the conversion at the receiving end. In other words, the parallel adder 916 in the circuit of FIG. 11 is replaced by the one for binary-coded decimal numbers, and the memory capacity of the shift registers 917 and 918 is increased by 3 bits to 8 bits, thereby making it possible to produce a binary-coded decimal code of 2 digits at the output terminal 14. In this connection, it will be needless to say that the AND gates and OR gates provided around the setting circuits 901 and 903 are required to be ones capable of processing binary-coded decimal numbers. Such a conversion as mentioned is not necessary in the case of the permutation code involving four frequency signals, as it is substantially in the same effect whether the maximum value 3! of the weight constant takes the form of binary number or a binary-coded decimal number.

In the above description of the embodiment of the converter at the transmitting end, the binary-coded data "0 0 0 0 0" or 0 in decimal number was defined as the permutation code "$P_1, P_2, P_3, P_4$", and the matrix comprising the data $P_1, P_2, P_3$ and $P_4$ in which all the diagonal elements are "1" and the other elements "0" was considered to be the fundamental matrix for conversion from a numerical code to a permutation code. It is not always required, however, that the numerical code data "0 0 0 0 0" correspond to the permutation code "$P_1, P_2, P_3, P_4$". For example, the numerical code data "0 0 0 0 0" may be considered to be equivalent to the permutation code "$P_2, P_4, P_1, P_3$". The same can be said of the converter at the receiving end.

As will be seen from the above description, by providing the data transmission system with the abovedescribed converter means at the transmitting and receiving ends, it is possible to increase the communication speed to a marked degree on the one hand and, if used with the data processing system, to improve the reliability in such fields of operation as exchange of information of various types and remote control of a variety of equipment from a distance. Especially, the system according to the present invention is applicable to the remote control of underwater equipment by an ultrasonic wave including the start, stop and reverse movement of underwater bulldozers as well as to the positioning of underwater bulldozers from the view of the prevention of erroneous operation of the underwater equipment due to reverberation, the smooth handling of the ever-increasing amount of information and the need for a higher speed of data transmission.

It will thus be understood that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

We claim:

1. A data transmission system for transmitting a plurality of numerical codes, successively, comprising:
    first means for converting each of the numerical codes to be transmitted to a corresponding one of permutation codes represented by a corresponding one of permutations, in time sequence, of a predetermined number of different frequency signals;
    said first means including matrix means having memories for storing any one of said permutation codes in the form of a matrix, the contents of said memories representing, respectively, elements constituting said matrix so as to indicate the time sequence in transmission of said frequency signals of said one permutation code, means for storing a plurality of weight constants predetermined according to the number of bits constituting each of said numerical codes, means for calculating numerical values by processing said numerical code with respect to said weight constants, successively in order from a larger one to a smaller one of said weight constants, each of said numerical values representing the number of units of the corresponding weight constant contained in a residue of the numerical code after processing of the same with respect to the weight constants larger than said corresponding weight constant, and means for applying a specific one of said permutation codes to said matrix means and effecting shifting of the contents of selected memories in a predetermined mode, repeatedly, by a number of times whose number is dependent on said numerical values, thereby to obtain a new matrix indicative of the time sequence of said frequency signals corresponding to the permutation code of each numerical code, second means for transmitting said different frequency signals in time sequence indicated by said new matrix, and third means for receiving said frequency signals transmitted by said second means and converting said signals into numerical codes.

2. A data transmission system according to claim 1, in which said weight constant storing means stores weight constants including $(m-1)!, (m-2)!, ......, 2!, 1!$ in the event that said numerical code comprises $m$ bits.

3. A data transmission system according to claim 1, in which said calculating means include comparator means for comparing each of said numerical codes with the weight constants stored in said weight constant storing means, and means for subtracting the result of the comparison by said comparator means from said numerical code.

4. A data transmission system according to claim 3, in which said weight constant storing means stores weight constants including $(m-1)!, (m-2)!, ......, 2!, 1!$ in the event that said numerical code comprises $m$ bits.

5. A data transmission system according to claim 3, in which said weight constant storing means include gate means for comparing said numerical codes in the order of magnitude of said weight constants.

6. A data transmission system comprising:

means for receiving permutation code signals representing numerical codes, respectively, each of said permutation code signals being transmitted in the form of a corresponding one of the permutations of a predetermined number of different frequency signals;

matrix means having memories for storing any one of said permutation code signals in the form of a matrix, the contents of said memories representing, respectively, the elements constituting said matrix so as to indicate the time sequence of said frequency signals of said one permutation code signal, means for applying said received permutation code signals to said matrix means to store the frequency signals constituting said permutation code in selected memories of said matrix means such that the time sequence of said frequency signals in receiving of said permutation code is in accordance with the time sequence represented by the elements of said matrix representing said selected memories, means for storing a plurality of weight constants predetermined according to the number of bits constituting each of said numerical codes, means for effecting shifting of the contents of said memories of said matrix means, in a predetermined mode, repeatedly, by a number of times with respect to each of said weight constants, successively, so that the contents of said memories are finally shifted to the memories representing predetermined elements of said matrix, and determining the number of repeating times with respect to each of said weight constants, and means for processing the number of repeating times of the shifting and said weight constants to produce a numerical code corresponding to each permutation code signal.

7. A data transmission system according to claim 6 in which said weight constant storing means stores weight constants including $(m-1)!, (m-2)!, ......, 2!, 1!$ in the event that said numerical code comprises $m$ bits.

8. A data transmission system according to claim 6, in which said processing means include means for multiplying each of said number of shifts by each of said weight constants and means for adding the results of said multiplications.

9. A data transmission system according to claim 8, in which said weight constant storing means stores weight constants including $(m-1)!, (m-2)!, ......, 2!, 1!$ in the event that said numerical code comprises $m$ bits.

* * * * *